(12) United States Patent
Shimezawa

(10) Patent No.: US 11,818,693 B2
(45) Date of Patent: Nov. 14, 2023

(54) TERMINAL DEVICE, BASE STATION DEVICE, AND COMMUNICATION METHOD FOR COMMUNICATING ACCORDING TO A DETERMINED SUBCARRIER SPACING

(71) Applicant: Sony Group Corporation, Tokyo (JP)

(72) Inventor: Kazuyuki Shimezawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 102 days.

(21) Appl. No.: 17/340,193

(22) Filed: Jun. 7, 2021

(65) Prior Publication Data
US 2021/0298017 A1 Sep. 23, 2021

Related U.S. Application Data

(63) Continuation of application No. 16/088,567, filed as application No. PCT/JP2017/003683 on Feb. 2, 2017, now Pat. No. 11,057,883.

(30) Foreign Application Priority Data

Apr. 21, 2016 (JP) .................................. 2016-085087

(51) Int. Cl.
*H04W 56/00* (2009.01)
*H04W 72/0446* (2023.01)
(Continued)

(52) U.S. Cl.
CPC ........ *H04W 72/0446* (2013.01); *H04B 7/068* (2013.01); *H04B 17/382* (2015.01);
(Continued)

(58) Field of Classification Search
CPC .............. H04W 56/001; H04W 56/002; H04B 17/382; H04L 47/70; H04L 67/141; H04L 27/26025; H04L 27/2666
See application file for complete search history.

(56) References Cited

U.S. PATENT DOCUMENTS

2010/0008282 A1 1/2010 Bhattad
2013/0114570 A1 5/2013 Park
(Continued)

FOREIGN PATENT DOCUMENTS

CN 103563277 A 2/2014
CN 103733560 A 4/2014
(Continued)

OTHER PUBLICATIONS

"3rd Generation Partnerstap Project; Technical Specification Group Radio Access Network; Physical layer aspects for evolved Universal Terrestrial Radio Access (UTRA) (Release 7)", 3GPP Standard: 25814-710, 3rd Generation Partnership Project (3GPP)?, Mobile Competence Centre ; 650 Route Des Lucioles ; F-06921 Sophia-Antipolis Cedex ; France. Oct. 2, 2006 (Oct. 2 2006), XP050909989, Retrieved from the Internet: URL http://www.3gpp.org/ftp/Specs/ 2014-12/Rel?/25_series/retrieved on Oct. 2, 2005).

(Continued)

*Primary Examiner* — Salvador E Rivas
(74) *Attorney, Agent, or Firm* — XSENSUS LLP

(57) ABSTRACT

A terminal device includes: a higher layer processing unit configured to set at least one first RAT and at least one second RAT by signaling of a higher layer from the base station device; and a receiving unit configured to receive a transmission signal in the first RAT and a transmission signal in the second RAT. The transmission signal in the first RAT is mapped to a resource element configured on a basis of one physical parameter for each sub frame. The transmission signal in the second RAT is mapped to a resource element configured on a basis of one or more physical parameters for each sub frame and is mapped to a resource element configured on a basis of one physical parameter in a predetermined resource included in each of the sub frames.

17 Claims, 19 Drawing Sheets

(51) Int. Cl.

| | |
|---|---|
| *H04W 76/15* | (2018.01) |
| *H04L 5/00* | (2006.01) |
| *H04W 72/04* | (2023.01) |
| *H04B 7/06* | (2006.01) |
| *H04L 27/26* | (2006.01) |
| *H04B 17/382* | (2015.01) |
| *H04W 88/06* | (2009.01) |
| *H04L 1/1867* | (2023.01) |
| *H04L 47/70* | (2022.01) |
| *H04L 67/141* | (2022.01) |

(52) U.S. Cl.
CPC ...... *H04L 5/0091* (2013.01); *H04L 27/26025* (2021.01); *H04L 27/2666* (2013.01); *H04W 56/001* (2013.01); *H04W 56/002* (2013.01); *H04W 72/04* (2013.01); *H04W 76/15* (2018.02); *H04L 1/1893* (2013.01); *H04L 47/70* (2013.01); *H04L 67/141* (2013.01); *H04W 88/06* (2013.01)

(56) References Cited

U.S. PATENT DOCUMENTS

| | | | |
|---|---|---|---|
| 2013/0170464 | A1 | 7/2013 | Hwang |
| 2013/0176952 | A1 | 7/2013 | Shin |
| 2014/0003385 | A1 | 1/2014 | Dinan |
| 2015/0043491 | A1 | 2/2015 | Eng et al. |
| 2015/0085735 | A1 | 3/2015 | Shelby |
| 2015/0264683 | A1 | 9/2015 | Kim |
| 2015/0304994 | A1 | 10/2015 | Kim |
| 2015/0373668 | A1 | 12/2015 | Lee |
| 2016/0308636 | A1* | 10/2016 | Deng .................... H04W 72/54 |
| 2016/0366594 | A1* | 12/2016 | Chang ..................... H04L 5/14 |
| 2016/0381539 | A1* | 12/2016 | Park ...................... H04W 76/50 455/404.2 |
| 2017/0094547 | A1* | 3/2017 | Yum ................... H04W 56/001 |
| 2017/0245165 | A1* | 8/2017 | Onggosanusi ........ H04W 24/08 |
| 2017/0289965 | A1* | 10/2017 | You ........................ H04L 5/005 |
| 2018/0146404 | A1 | 5/2018 | Zhang et al. |
| 2019/0222288 | A1 | 7/2019 | Zhou |

FOREIGN PATENT DOCUMENTS

| | | |
|---|---|---|
| CN | 104094549 A | 10/2014 |
| WO | WO-2015172364 A1 | 11/2015 |
| WO | 2016043020 A1 | 3/2016 |
| WO | WO-2016052017 A1 | 4/2016 |

OTHER PUBLICATIONS

Huawei et al. "Flexible air interface of NR" 3GPP Draft: R2-182660 Flexible Air Interface of NR, 3rd Generation Partnership Project (3GPP), Mobile Competence Centre ; 650, Route Des Lucioles ; F-06921Sophia-Antipous Cedex . France ,vol. RAN WG2, no. Dubrovnik, Croatia; Apr. 11, 2018-Apr. 15, 2016 Apr. 1, 2018(Apr. 1, 2018), XP051082245,Retrieved from the Internet: URL:http://www.3gpp.org/ftp/tag_ran/WG2_RL2/TSGR2_93bis/Docs/ [retrieved Apr. 1, 2016].

Panasonic: "View on RAT and IMT-2020 Panasonic 3GPP RAN workshop on 5G RWS-150008", 3GPP RAN Workshop on 5G, Phoenix, AZ, USA. Sep. 17, 2015(Sep. 17, 2015) pp. 1-12, XP055836816, Retrieved from the Internet.URL:http://www.3gpp.org/ftp/workshop/2015-09-17_18_RAN_5G/Docs/[retrieved Spe. 1, 2021].

LG Electronics, "Remaining Issues on NB-PDCCH", 3GPP TSG RAN WG1 Meeting #84bis, R1-162458, Bushan, Korea, Apr. 11-15, 2016.

MediaTek Inc., :UL grant design in RAR, 3GPP Tsg Ran WG1 Meeting #84bis, R1-163262, Busan, Korea, Apr. 11-15, 2016.

Intel Corporation, Overview of new radio access technology requirements and designs [online], 3GPP TSG-RAN WG1 #84b R1-162379, Internet<URL:http://www.3gpp.org/ftp/tsg_ran/WG1_RL1/TSGR1_84b/Docs/R1-162379.zip>, Apr. 11, 2016.

Panasonic, Forward compatibility aspect of NR [online], 3GPP TSG-RAN WG1#84b R1-162553, Internet URL: http://www.3gpp.org/ftp/tsg_ran/WG1_RL1/TSGR1_84_b/Docs/R1-162553.zip>, Apr. 11, 2016.

ZTE, Consideration on forward compatibility for new radio interface [online], 3GPP TSG-RAN WG1#64b R1-163392, Internet<URL:http://www.3gpp.org/ftp/tsg_ran/WG1_RL1/TSGR1_84b/Docs/R1-163392.zip>, Apr. 11, 2016.

Mediatek Inc: "Discussion on resource allocation of NB-PUSCH", 3GPP Draft; R1-160774 Discussion on Resource Allocation of NB-PUSCH, 3rd Generation Partnership Project (3GPP), vol. RAN 'WGI; Feb. 15, 2016-Feb. 19, 2016 Feb. 14, 2016 (Feb. 14, 2016), XP051054101, Retrieved from the Internet: URL:http://www.3gpp.org/ftp/Meetings_3GPP_SYNC/RAN1/Docs/ [retrieved on Feb. 14, 2016].

MCC Support: "Draft Report of 3GPP TSG RAN WGI #84 V0.1.0", 3GPP Draft; Draft Minutes Report RAN1#84 V010, 3rd Generation Partnership Project (3GPP), vol. RAN WGI; Apr. 11, 2016-Apr. 15, 2016 Feb. 22, 2016 (Feb. 22, 2016), XP051079501, Retrieved from the Internet: URL:http://www.3gpp.org/ftp/tsg_ran/WGI_RL1/TSGRI84/Report/ [retrieved on Feb. 22, 2016].

Qualcomm Incorporated: "Draft TP for D2D for TS 36.300", 3GPP Draft; R1-142966 QC_D2D_ TP_36 300, 3rd Generation Partnership Project-(3GPP), vol. RAN WGI; Aug. 18, 2014-Aug. 22, 2014 Aug. 17, 2014 (Aug. 17, 2014), XP050788446, Retrieved from the Internet: URL:http://www.3gpp.org/ftp/Meetings 3GPP_SYNC/RAN1/Docs/ [retrieved on Aug. 17, 2014] * p. 16/3 *.

Lg Electronics: "Overall discussions on Uplink Transmission for NB-IoT", 3GPP Draft; R1-160117 Resource Unit, 3rd Generation Partnership Project (3GPP), vol. RAN WGI; Jan. 18, 2016-Jan. 20, 2016 Jan. 12, 2016, (Jan. 12, 2016), XP051064729, Retrieved from the Internet: URL:http://www.3gpp.org/ftp/tsg_ran/WGI_RL_1/TSGRI_AH/LTE_NB-IoT_1601/Docs/ [retrieved on Jan. 12, 2016].

Nokia et al.: Basic frame structure principles for 5G new radio, 3GPP Draft; R1-162893, 3rd Generation Partnership Project (3GPP), vol. RAN WGI; Apr. 11, 2016-Apr. 15, 2016 Apr. 1, 2016 (Apr. 1, 2016), XP051079734, Retrieved from the Internet: URL:http://www.3gpp.org/ftp/tsg_ran,WGI_RL_1/TSGRI_84b/Docs/ [retrieved on Apr. 1, 2016] * 4th page, lines 16-24, without considering the Figure 1 *.

RAN WGI: Status Report to TSG 1 Work plan related evaluation, 3GPP Draft; RP-160183, 3rd Generation Partnership Project (3GPP), vol. TSG RAN; Mar. 7, 2016-MAr. 10, 2016 Mar. 6, 2016 (Mar. 6, 2016), XP051076140, Retrieved from the Internet: URL:http://www.3gpp.org/ftp/Meetings_3GPP SYNC/RAN/Docs/ [retrieved on Mar. 6, 2016].

Extended European Search Report dated Mar. 28, 2019 in European Application No. 17785597.0-1213.

"3rd Generation Partnership Project; Technical Specification Group Radio Access Network; Study on Scenarios and Requirements for Next Generation Access Technologies; (Release 14)", 3GPP TR 38.913 V0.2.0, Technical Report, pp. 1-19 (Feb. 2016).

Classon, B., "Scenario & design criteria on flexible numerologies," 3GPP TSG UAN WGI Meeting #84bis, pp. 1-7 (Apr. 11-15, 2016).

Pani, D.,"Control Plane Aspects for Interworking between NR and LTE," 3GPP TSG-RAN WG2 #93bis, pp. 1-5 (Apr. 11-15, 2016).

Takeda, K., "Initial views on numerology for NR access techonology," 3GPP TSG RAN WG1 Meeting #84bis, pp. 1-12 (Apr. 11-15, 2016).

Tao, C., "Numerology Considerations for Next Generation New Radio Access," 3GPP TSG RAN WG1 Meeting #84bis, pp. 1-3 (Apr. 11-15, 2016).

Yazar, A., "Flexible numerology for 5G New Radio," 3GPP TSG-RAN WG1 Meeting #84bis, Nokia, Alcatel-Lucent Shanghai Bell, pp. 1-5 (Apr. 11-15, 2016).

Yuan, Y.,"Discussion on the numerology and frame structure design for new radio," 3GPP TSG RAN WG1 Meeting #84bis, pp. 1-3 (Apr. 11-15, 2016).

(56) References Cited

OTHER PUBLICATIONS

Zaidi et al., "Numerology requirements," 3GPP TSG RAN WG1 Meeting #84bis, pp. 1-7 (Apr. 11-15, 2016).
English Translation of International Search Report and Written Opinion for International Application No. PCT/ JP2017/003683, dated May 9, 2017.
R1-162157, "Overview of 5G frame structure", Apr. 11-15, 2016, pp. 1-6 (Year: 2016).
3GPP Organizational Partners; "(Release 13); Performance Requirement"; 3GPP-TS36.101-V13.3.0; Mar. 2016.
3GPP Organizational Partners; "3rd Generation Partnership Project; Technical Specification Group Radio Access Network; Evolved Universal Terrestrial Radio Access (E-UTRA); Physical channels and modulation (Release 13)"; 3GPP-TS36.211-V13.1.0, Mar. 2016.
3GPP Organizational Partners; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; 3GPP-TS36.300-V13.3.0, Mar. 2016.
3GPP Organizational Partners, "3rd Generation Partnership Project; Technical Specification Group Radio Access Network; Evolved Universal Terrestrial Radio Access (E-UTRA); Radio Resource Control; Protocol specification (Release 13)"; 3GPP-TS36.331-V13.1.0, Mar. 2016.

* cited by examiner

FIG. 5

| | SUB CARRIER INTERVAL | NUMBER OF SUB CARRIERS PER RESOURCE BLOCK IN NR CELL | NUMBER OF SYMBOLS PER SUB FRAME | CP LENGTH TYPE |
|---|---|---|---|---|
| PARAMETER SET 0 | 15 kHz | 12 | 14 | TYPE 1 |
| PARAMETER SET 1 | 7.5 kHz | 24 | 7 | TYPE 1 |
| PARAMETER SET 2 | 30 kHz | 6 | 28 | TYPE 1 |
| PARAMETER SET 3 | 15 kHz | 12 | 12 | TYPE 2 |
| ... | ... | ... | ... | ... |

TERMINAL DEVICE, BASE STATION DEVICE, AND COMMUNICATION METHOD FOR COMMUNICATING ACCORDING TO A DETERMINED SUBCARRIER SPACING

CROSS-REFERENCE TO RELATED APPLICATIONS

The present application is a continuation of U.S. application Ser. No. 16/088,567, filed Sep. 26, 2018, which is based on PCT filing PCT/JP2017/003683, filed Feb. 2, 2017, which claims priority to JP 2016-085087, filed Apr. 21, 2016, the entire contents of each are incorporated herein by reference.

TECHNICAL FIELD

The present disclosure relates to a terminal device, a base station device, and a communication method.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device are arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V 0. 2.0 (2016-02). <http://www.3gpp.org/ftp//Specs/archive/38_series/38.913/38913-020.zip>

DISCLOSURE OF INVENTION

Technical Problem

In wireless access technologies, it is preferable to optimally design parameters (physical parameters) of transmission signals such as sub carrier intervals and symbol lengths in accordance with use cases. However, in review of LTE extension technologies, it is important for terminal devices using the extension technologies to perform multiplexing with terminal devices of LTE of the related art from the viewpoint of frequency use efficiency. Therefore, in extension technologies in LTE, backward compatibility is requested and restriction can be imposed on the extension technologies. As a result, such restriction may have an influence on transmission efficiency of the whole systems.

The present disclosure is devised in view of the foregoing problems and an object of the present disclosure is to provide a base station device, a terminal device, a communication system, a communication method, and an integrated circuit capable of considerably improving transmission efficiency of the whole system by flexibly designing in accordance with various use cases in the communication system in which the base station device and the terminal device communicate.

Solution to Problem

According to the present disclosure, there is provided a terminal device that communicates with a base station device, the terminal station device including: a higher layer processing unit configured to set at least one first RAT and at least one second RAT by signaling of a higher layer from the base station device; and a receiving unit configured to receive a transmission signal in the first RAT and a transmission signal in the second RAT. The transmission signal in the first RAT is mapped to a resource element configured on a basis of one physical parameter for each sub frame. The transmission signal in the second RAT is mapped to a resource element configured on a basis of one or more physical parameters for each sub frame and is mapped to a resource element configured on a basis of one physical parameter in a predetermined resource included in each of the sub frames.

In addition, according to the present disclosure, there is provided a base station device that communicates with a terminal device, the base station device including: a higher layer processing unit configured to set at least one first RAT and at least one second RAT by signaling of a higher layer to the terminal device; and a transmitting unit configured to transmit a transmission signal in the first RAT and a transmission signal in the second RAT. The transmission signal in the first RAT is mapped to a resource element configured on a basis of one physical parameter for each sub frame. Transmission signal in the second RAT is mapped to a resource element configured on a basis of one or more physical parameters for each sub frame and is mapped to a resource element configured on a basis of one physical parameter in a predetermined resource included in each of the sub frames.

In addition, according to the present disclosure, there is provided a communication method that is used in a terminal device communicating with a base station device, the communication method including: a step of setting at least one first RAT and at least one second RAT by signaling of a higher layer from the base station device; and a step of receiving a transmission signal in the first RAT and a transmission signal in the second RAT. The transmission signal in the first RAT is mapped to a resource element configured on a basis of one physical parameter for each sub frame. The transmission signal in the second RAT is mapped to a resource element configured on a basis of one or more physical parameters for each sub frame and is mapped to a resource element configured on a basis of one physical parameter in a predetermined resource included in each of the sub frames.

In addition, according to the present disclosure, there is provided a communication method that is used in a base station device communicating with a terminal device, the communication method including: a step of setting at least one first RAT and at least one second RAT by signaling of a higher layer to the terminal device; and a step of transmitting a transmission signal in the first RAT and a transmission signal in the second RAT. The transmission signal in the first RAT is mapped to a resource element configured on a basis of one physical parameter for each sub frame. The transmission signal in the second RAT is mapped to a resource element configured on a basis of one or more physical parameters for each sub frame and is mapped to a resource element configured on a basis of one physical parameter in a predetermined resource included in each of the sub frames.

Advantageous Effects of Invention

As described above, according to the present disclosure, it is possible to improve the transmission efficiency in the wireless communication system in which the base station device and the terminal device communicate with each other.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell according to the present embodiment.

MODE(S) FOR CARRYING OUT THE INVENTION

Figure 1:
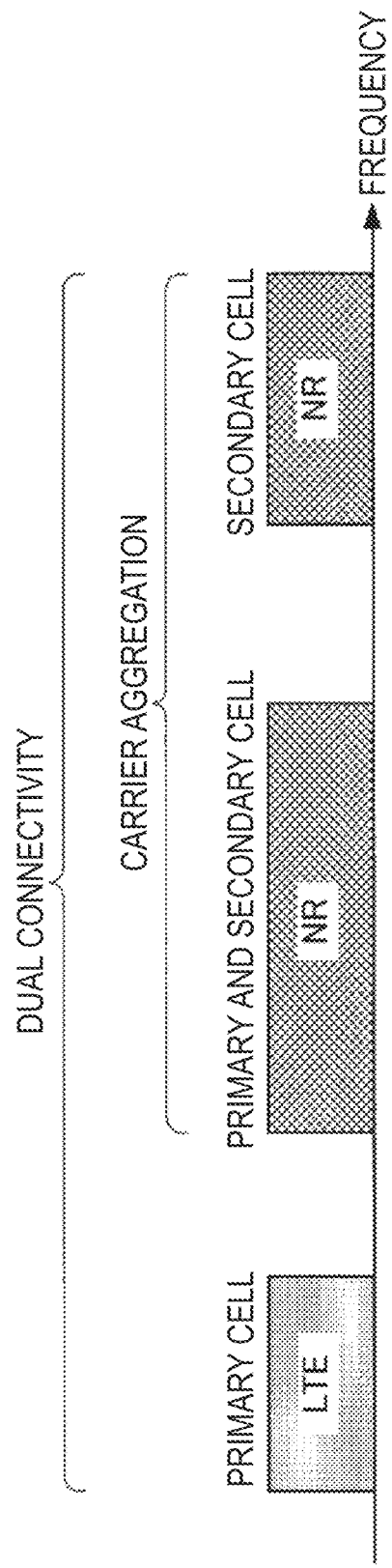
FIG. 1 is a diagram illustrating an example of setting of a component carrier according to a present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.
<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.
<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs are supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell. Further, LTE is referred to as a first RAT and NR is referred to as a second RAT.

Downlink communication is communication from the base station device 1 to the terminal device 2. Uplink communication is communication from the terminal device 2 to the base station device 1. Sidelink communication is communication from the terminal device 2 to another terminal device 2.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
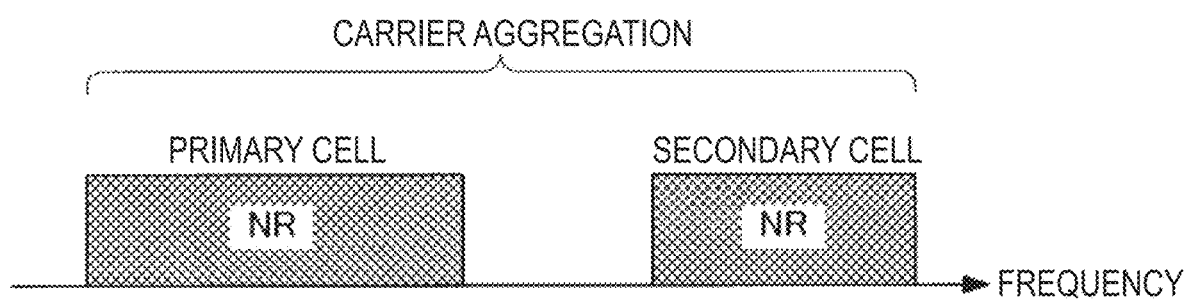
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations are supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations are specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats each sub frame as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a physical downlink channel and a physical downlink signal in the DwPTS of the special sub frame. The base station device 1 can restrict transmission of the PBCH in the DwPTS of the special sub frame. The terminal device 2 may transmit physical uplink channels and physical uplink signals in the UpPTS of the special sub frame. The terminal device 2 can restrict transmission of some of the physical uplink channels and the physical uplink signals in the UpPTS of the special sub frame.

<Frame Configuration of LTE in Present Embodiment>

Figure 3:
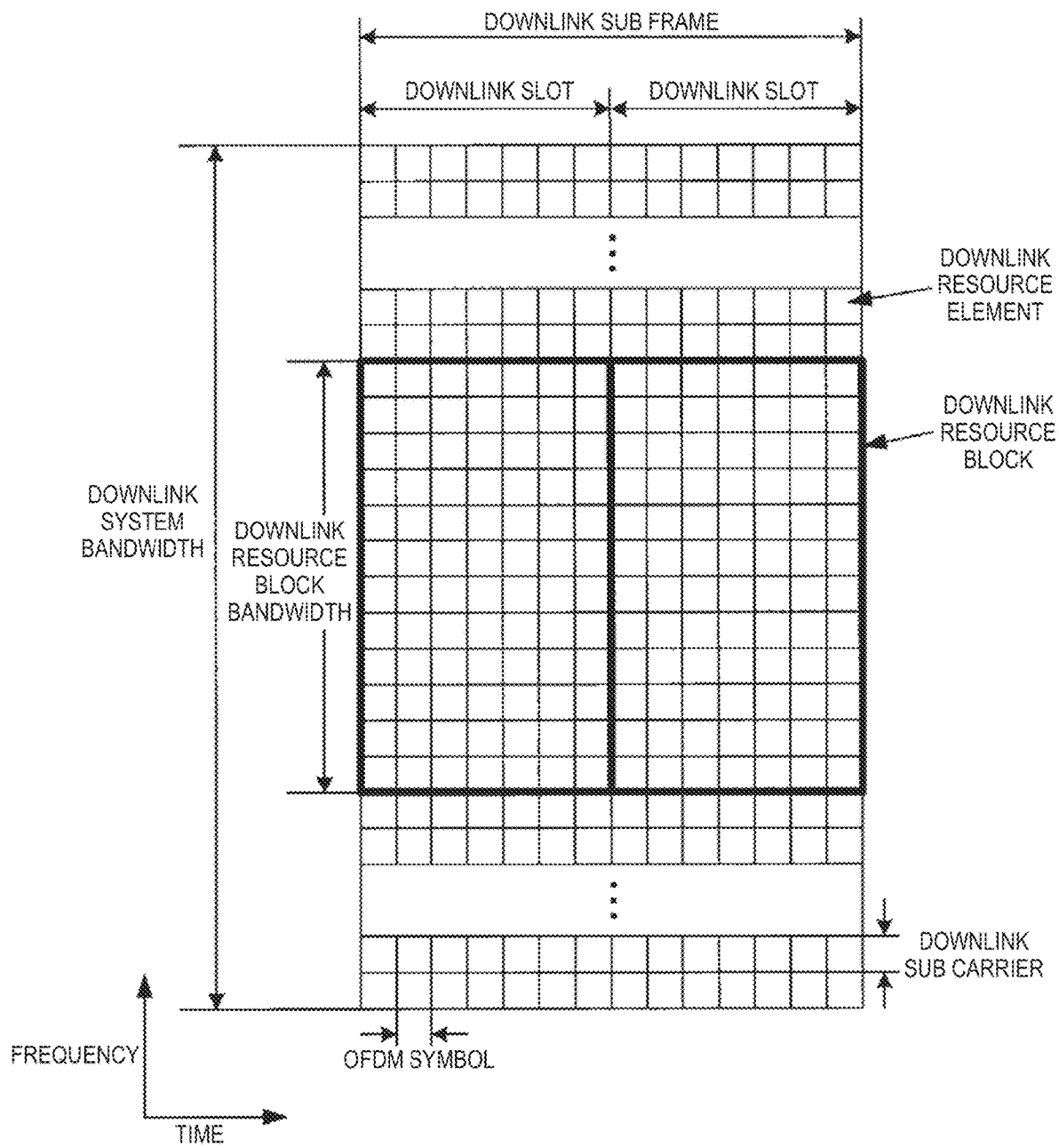
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a physical downlink channel of LTE and/or a physical downlink signal of LTE in a downlink sub frame to the terminal device 2. The terminal device 2 can receive a physical downlink channel of LTE and/or a physical downlink signal of LTE in a downlink sub frame from the base station device 1.

Figure 4:
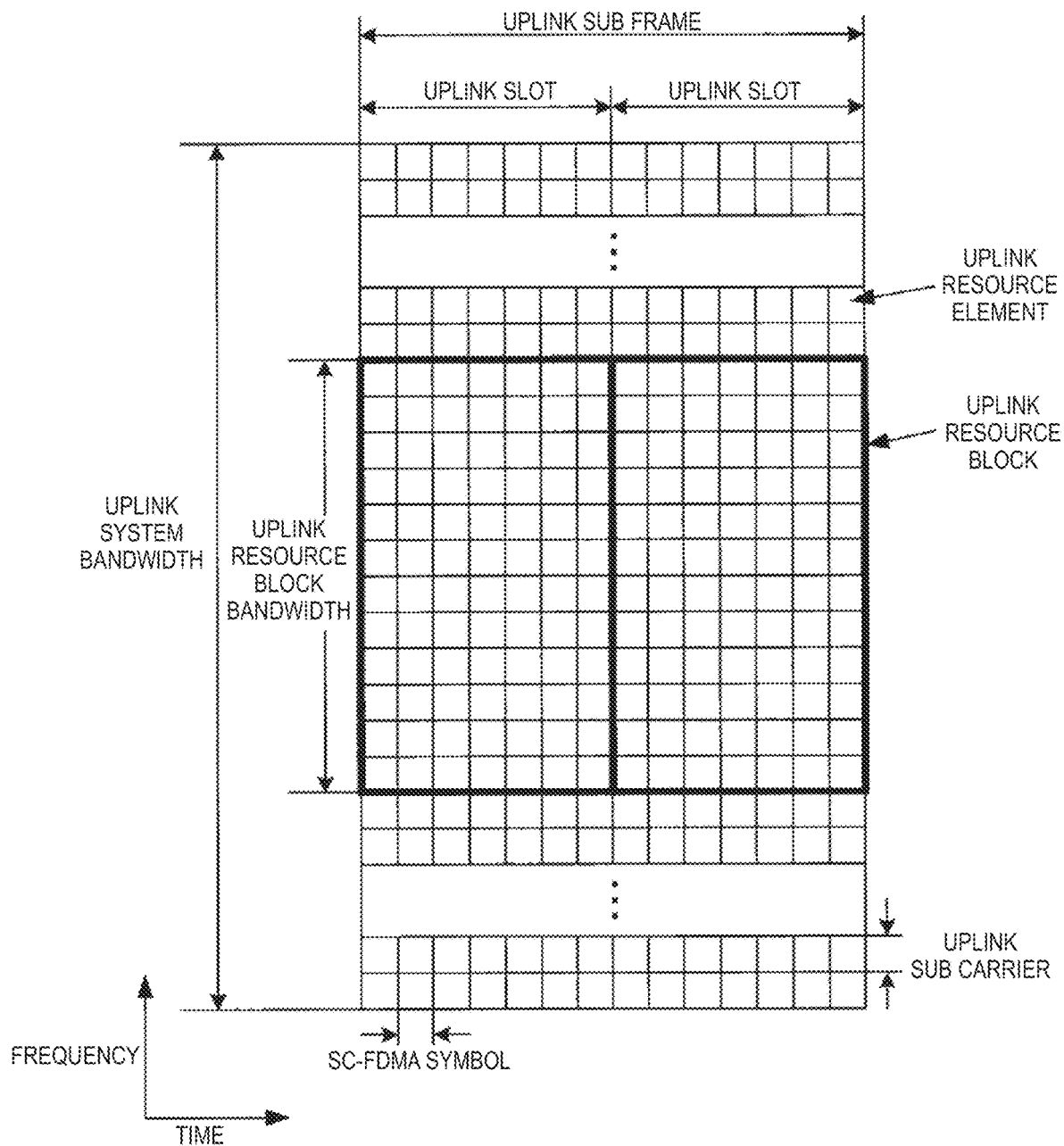
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit a physical uplink channel of LTE and/or a physical uplink signal of LTE in an uplink sub frame to the base station device 1. The base station device 1 can receive a physical uplink channel of LTE and/or a physical uplink signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
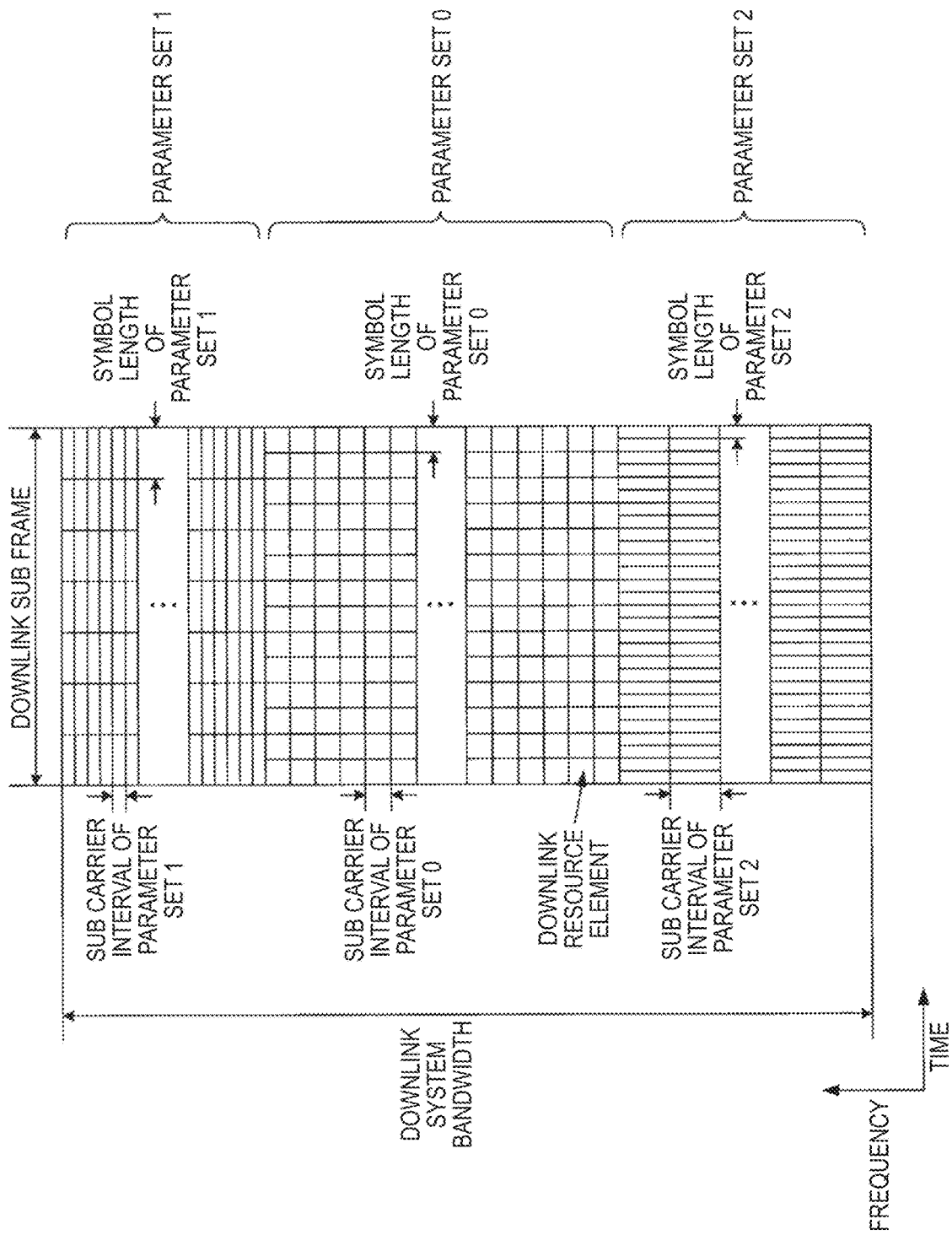
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the physical downlink channel of NR and/or the physical downlink signal of NR in a downlink sub frame to the terminal device 2. The terminal device 2 can receive a physical downlink channel of NR and/or the physical downlink signal of NR in a downlink sub frame from the base station device 1.

Figure 7:
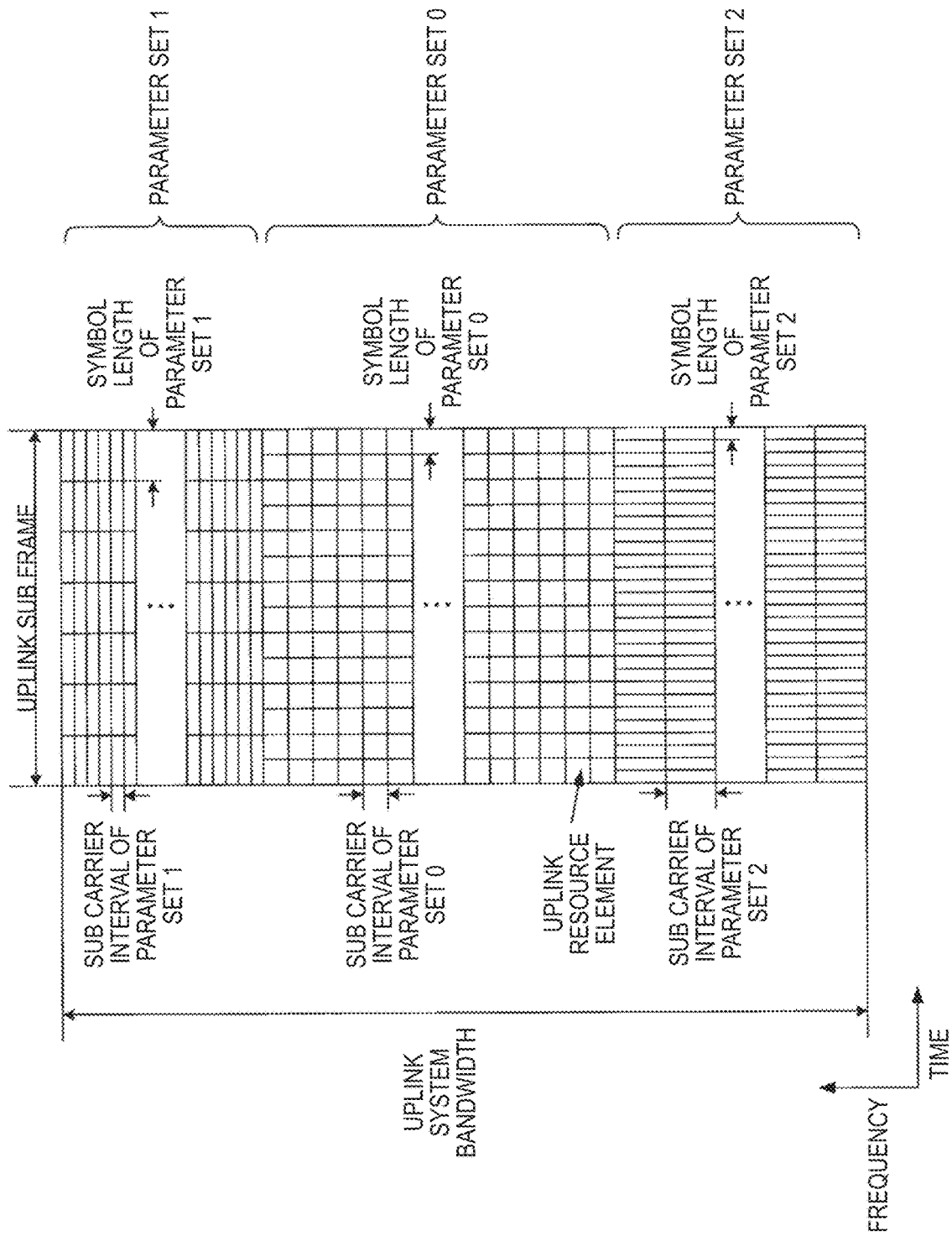
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the physical uplink channel of NR and/or the physical uplink signal of NR in an uplink sub frame to the terminal device 2. The terminal device 2 can receive a physical uplink channel of NR and/or the physical uplink signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a physical downlink channel, a physical uplink channel, and a physical sidelink channel. The physical signals include a physical downlink signal, a physical uplink signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

The physical downlink channel includes a Physical Broadcast Channel (PBCH), a Physical Control Format Indicator Channel (PCFICH), a Physical Hybrid automatic repeat request Indicator Channel (PHICH), a Physical Downlink Control Channel (PDCCH), an Enhanced PDCCH (EPDCCH), a Machine Type Communication (MTC) PDCCH (MTC MPDCCH), a Relay PDCCH (R-PDCCH), a Physical Downlink Shared Channel (PDSCH), a Physical Multicast Channel (PMCH), and the like.

The physical downlink signal includes a Synchronization Signal (SS), a Downlink Reference Signal (DL-RS), a Discovery Signal (DS), and the like.

The synchronization signal includes a primary synchronization signal (PSS), a secondary synchronization signal (SSS), and the like.

The reference signal in the downlink includes a cell-specific reference signal (CRS), a UE-specific reference signal associated with the PDSCH (PDSCH-DMRS), a demodulation reference signal associated with the EPDCCH (EPDCCH-DMRS), a positioning reference signal (PRS), a channel state information (CSI) reference signal (CSI-RS), a tracking reference signal (TRS), and the like. The PDSCH-DMRS is also referred to as a URS associated with the PDSCH or referred to simply as a URS. The EPDCCH-DMRS is also referred to as a DMRS associated with the EPDCCH or referred to simply as DMRS. The PDSCH-DMRS and the EPDCCH-DMRS are also referred to simply as a DL-DMRS or a downlink demodulation reference signal. The CSI-RS includes a non-zero power CSI-RS (NZP CSI-RS). Further, the downlink resources include a zero power CSI-RS (ZP CSI-RS), a channel state information-interference measurement (CSI-IM), and the like.

The physical uplink channel includes a physical uplink shared channel (PUSCH), a physical uplink control channel (PUCCH), a physical random access channel (PRACH), and the like.

The physical uplink signal includes an uplink reference signal (UL-RS).

The uplink reference signal includes an uplink demodulation signal (UL-DMRS), a sounding reference signal (SRS), and the like. The UL-DMRS is associated with transmission of the PUSCH or the PUCCH. The SRS is not associated with transmission of the PUSCH or the PUCCH.

The physical sidelink channel includes a Physical Sidelink Broadcast Channel (PSBCH), a Physical Sidelink Control Channel (PSCCH), a Physical Sidelink Discovery Channel (PSDCH), a Physical Sidelink Shared Channel (PSSCH), and the like.

The physical channel and the physical signal are also simply referred to a channel and a signal. That is, the physical downlink channel, the physical uplink channel, and the physical sidelink channel are also referred to as a downlink channel, an uplink channel, and a sidelink channel, respectively. The physical downlink signal, the physical uplink signal, and the physical sidelink signal are also referred to as a downlink signal, an uplink signal, and a sidelink signal, respectively.

The BCH, the MCH, the UL-SCH, and the DL-SCH are transport channels. The channel used in the medium access control (MAC) layer is referred to as a transport channel. A unit of the transport channel used in the MAC layer is also referred to as a transport block (TB) or a MAC protocol data unit (MAC PDU). In the MAC layer, control of a hybrid automatic repeat request (HARD) is performed for each transport block. The transport block is a unit of data that the MAC layer transfers (delivers) to the physical layer. In the physical layer, the transport block is mapped to a codeword, and an encoding process is performed for each codeword.

Note that the downlink reference signal and the uplink reference signal are also simply referred to as reference signals (RSs).

<LTE Physical Channel and LTE Physical Signal in Present Embodiment>

As described above, the description of the physical channel and the physical signal can also be applied to the LTE physical channel and the LTE physical signal, respectively. The LTE physical channel and the LTE physical signal are referred to as the following.

The LTE physical downlink channel includes an LTE-PBCH, an LTE-PCFICH, an LTE-PHICH, an LTE-PDCCH, an LTE-EPDCCH, an LTE-MPDCCH, an LTE-R-PDCCH, an LTE-PDSCH, an LTE-PMCH, and the like.

The LTE physical downlink signal an LTE-SS, an LTE-DL-RS, an LTE-DS, and the like. The LTE-SS includes an LTE-PSS, an LTE-SSS, and the like. The LTE-RS includes an LTE-CRS, an LTE-PDSCH-DMRS, an LTE-EPDCCH-DMRS, an LTE-RRS, an LTE-CSI-RS, an LTE-TRS, and the like.

The LTE physical uplink channel includes an LTE-PUSCH, an LTE-PUCCH, an LTE-PRACH, and the like.

The LTE physical uplink signal includes an LTE-UL-RS. The LTE-UL-RS includes an LTE-UL-DMRS, an LTE-SRS, and the like.

The LTE physical sidelink channel includes an LTE-PSBCH, an LTE-PSCCH, an LTE-PSDCH, an LTE-PSSCH, and the like.

<NR Physical Channel and NR Physical Signal in Present Embodiment>

As described above, the description of the physical channel and the physical signal can also be applied to the NR physical channel and the NR physical signal, respectively. The NR physical channel and the NR physical signal are referred to as the following.

The NR physical downlink channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR physical downlink signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR physical uplink channel includes an NR-PUSCH, an NR-PUCCH, an NR-PRACH, and the like.

The NR physical uplink signal includes an NR-UL-RS. The NR-UL-RS includes an NR-UL-DMRS, an NR-SRS, and the like.

The NR physical sidelink channel includes an NR-PSBCH, an NR-PSCCH, an NR-PSDCH, an NR-PSSCH, and the like.

<Physical Downlink Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PCFICH is used to transmit information related to the number of OFDM symbols used for transmission of the PDCCH. A region indicated by PCFICH is also referred to as a PDCCH region. The information transmitted through the PCFICH is also referred to as a control format indicator (CFI).

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Physical Downlink Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/timing synchronization (synchronization in the time domain) or cell group identification. The SSS may be used for more accurate frame timing synchronization or cell identification. In other words, frame timing synchronization and cell identification can be performed using the PSS and the SSS.

The downlink reference signal is used for the terminal device 2 to perform propagation path estimation of the physical downlink channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS are transmitted with zero output power. In other words, the resources of the ZP CSI-RS are not transmitted. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

Resources of the CSI-IM are set by the base station device 1. The resources of the CSI-IM are resources used for measuring interference in CSI measurement. The resources of the CSI-IM can be set to overlap some of the resources of the ZP CSI-RS. For example, in a case in which the resources of the CSI-IM are set to overlap some of the resources of the ZP CSI-RS, a signal from a cell performing the CSI measurement is not transmitted in the resources. In other words, the base station device 1 does not transmit the PDSCH, the EPDCCH, or the like in the resources set by the CSI-IM. Therefore, the terminal device 2 can perform the CSI measurement efficiently.

The MBSFN RS is transmitted in the entire band of the sub frame used for transmission of the PMCH. The MBSFN RS is used for demodulation of the PMCH. The PMCH is transmitted through an antenna port used for transmission of the MBSFN RS. The MBSFN RS is transmitted through the antenna port 4.

The PRS is used for the terminal device 2 to measure positioning of the terminal device 2. The PRS is transmitted through the antenna port 6.

The TRS can be mapped only to predetermined sub frames. For example, the TRS is mapped to the sub frames 0 and 5. Further, the TRS can use a configuration similar to a part or all of the CRS. For example, in each resource block, a position of a resource element to which the TRS is mapped can be caused to coincide with a position of a resource element to which the CRS of the antenna port 0 is mapped. Further, a sequence (value) used for the TRS can be decided on the basis of information set through the PBCH, the PDCCH, the EPDCCH, or the PDSCH (RRC signaling). A sequence (value) used for the TRS can be decided on the basis of a parameter such as a cell ID (for example, a physical layer cell identifier), a slot number, or the like. A sequence (value) used for the TRS can be decided by a method (formula) different from that of a sequence (value) used for the CRS of the antenna port 0.

<Physical Uplink Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs are frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Physical Uplink Signal in Present Embodiment>

The uplink DMRS is associated with transmission of the PUSCH or the PUCCH. The DMRS is time-multiplexed with the PUSCH or the PUCCH. The base station device 1 may use the DMRS to perform the propagation path correction of the PUSCH or the PUCCH. In the description of the present embodiment, the transmission of the PUSCH also includes multiplexing and transmitting the PUSCH and DMRS. In the description of the present embodiment, the transmission of the PUCCH also includes multiplexing and transmitting the PUCCH and the DMRS. Further, the uplink DMRS is also referred to as an UL-DMRS. The SRS is not associated with the transmission of the PUSCH or the PUCCH. The base station device 1 may use the SRS to measure the uplink channel state.

The SRS is transmitted using the last SC-FDMA symbol in the uplink sub frame. In other words, the SRS is placed in the last SC-FDMA symbol in the uplink sub frame. The terminal device 2 can restrict simultaneous transmission of the SRS, the PUCCH, the PUSCH, and/or the PRACH in a certain SC-FDMA symbol of a certain cell. The terminal device 2 can transmit the PUSCH and/or the PUCCH using the SC-FDMA symbol excluding the last SC-FDMA symbol in a certain uplink sub frame of a certain cell in the uplink sub frame and transmit the SRS using the last SC-FDMA symbol in the uplink sub frame. In other words, the terminal device 2 can transmit the SRS, the PUSCH, and the PUCCH in a certain uplink sub frame of a certain cell.

In the SRS, a trigger type 0 SRS and a trigger type 1 SRS are defined as SRSs having different trigger types. The trigger type 0 SRS is transmitted in a case in which a parameter related to the trigger type 0 SRS is set by signaling of a higher layer. The trigger type 1 SRS is transmitted in a case in which a parameter related to the trigger type 1 SRS is set by signaling of the higher layer, and transmission is requested by an SRS request included in the DCI format 0, 1A, 2B, 2C, 2D, or 4. Further, the SRS request is included in both FDD and TDD for the DCI format 0, 1A, or 4 and included only in TDD for the DCI format 2B, 2C, or 2D. In a case in which the transmission of the trigger type 0 SRS and the transmission of the trigger type 1 SRS occur in the same sub frame of the same serving cell, a priority is given to the transmission of the trigger type 1 SRS.

<Physical Resources for Control Channel in Present Embodiment>

A resource element group (REG) is used to define mapping of the resource element and the control channel. For example, the REG is used for mapping of the PDCCH, the PHICH, or the PCFICH. The REG is constituted by four consecutive resource elements which are in the same OFDM symbol and not used for the CRS in the same resource block. Further, the REG is constituted by first to fourth OFDM symbols in a first slot in a certain sub frame.

An enhanced resource element group (EREG) is used to define mapping of the resource elements and the enhanced control channel. For example, the EREG is used for mapping of the EPDCCH. One resource block pair is constituted by 16 EREGs. Each EREG is assigned a number of 0 to 15 for each resource block pair. Each EREG is constituted by 9 resource elements excluding resource elements used for the DM-RS associated with the EPDCCH in one resource block pair.

<Configuration Example of Base Station Device 1 in Present Embodiment>

Figure 8:
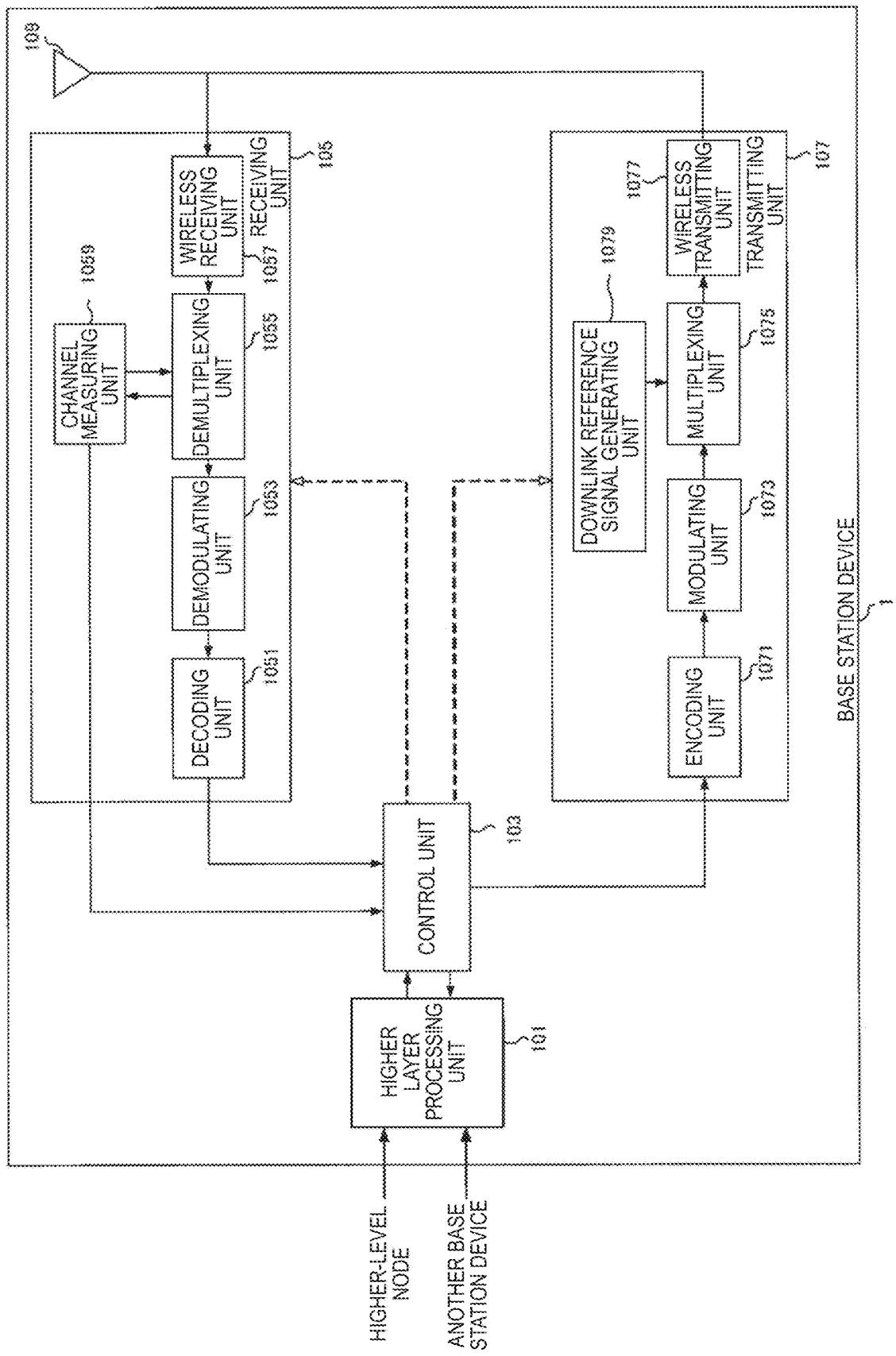
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer.

Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control.

The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a settings related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured through the UL-DMRS, and an uplink channel quality is measured through the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Base Station Device 1 in Present Embodiment>

Figure 9:
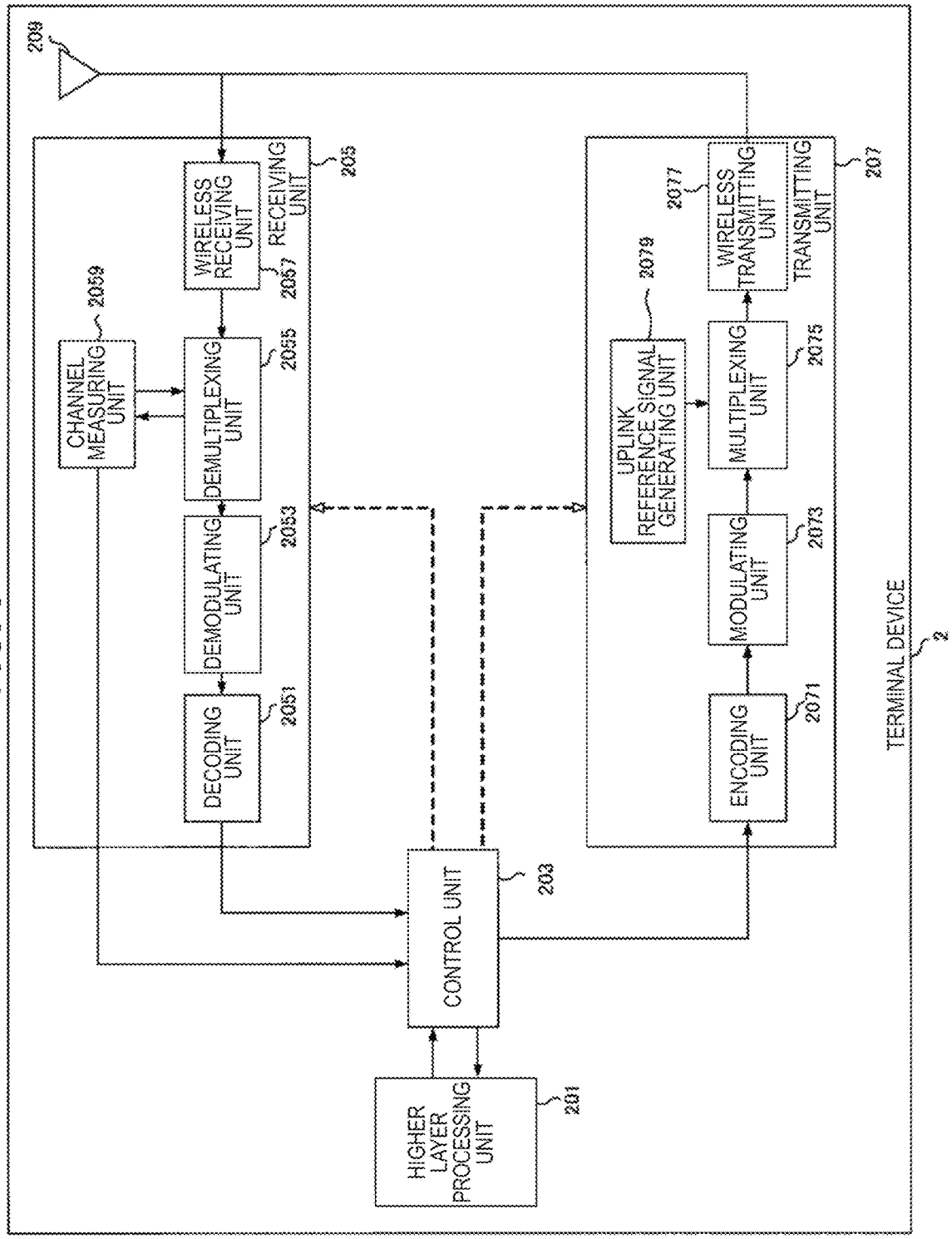
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), and an eIMTA-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible to individually transmit the control channel specific to the terminal device 2. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, the EREG is not defined for a resource element to which a demodulation reference signal associated with an EPDCCH transmitted through antenna ports 107 to 110 is mapped.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<Details of Channel State Information in Present Embodiment>

The terminal device 2 reports the CSI to the base station device 1. The time and frequency resources used to report the CSI are controlled by the base station device 1. In the terminal device 2, a setting related to the CSI is performed through the RRC signaling from the base station device 1. In the terminal device 2, one or more CSI processes are set in a predetermined transmission mode. The CSI reported by the terminal device 2 corresponds to the CSI process. For example, the CSI process is a unit of control or setting related to the CSI. For each of the CSI processes, a setting related to the CSI-RS resources, the CSI-IM resources, the periodic CSI report (for example, a period and an offset of a report), and/or the non-periodic CSI report can be independently set.

The CSI includes a channel quality indicator (CQI), a precoding matrix indicator (PMI), a precoding type indicator (PTI), a rank indicator (RI), and/or a CSI-RS resource indicator (CRI). The RI indicates the number of transmission layers (the number of ranks). The PMI is information indicating a precoding matrix which is specified in advance. The PMI indicates one precoding matrix by one piece of information or two pieces of information. In a case in which two pieces of information are used, the PMI is also referred to as a first PMI and a second PMI. The CQI is information indicating a combination of a modulation scheme and a coding rate which are specified in advance. The CRI is information (single instance) indicating one CSI-RS resource selected from two or more CSI-RS resources in a case in which the two or more CSI-RS resources are set in one CSI process. The terminal device 2 reports the CSI to recommend to the base station device 1. The terminal device 2 reports the CQI satisfying a predetermined reception quality for each transport block (codeword).

In the CRI report, one CSI-RS resource is selected from the CSI-RS resources to be set. In a case in which the CRI is reported, the PMI, the CQI, and the RI to be reported are calculated (selected) on the basis of the reported CRI. For example, in a case in which the CSI-RS resources to be set are precoded, the terminal device 2 reports the CRI, so that precoding (beam) suitable for the terminal device 2 is reported.

A sub frame (reporting instances) in which periodic CSI reporting can be performed are decided by a report period and a sub frame offset set by a parameter of a higher layer (a CQIPMI index, an RI index, and a CRI index). Further, the parameter of the higher layer can be independently set in a sub frame set to measure the CSI. In a case in which only one piece of information is set in a plurality of sub frame sets, that information can be set in common to the sub frame sets. In each serving cell, one or more periodic CSI reports are set by the signaling of the higher layer.

A CSI report type supports a PUCCH CSI report mode. The CSI report type is also referred to as a PUCCH report type. A type 1 report supports feedback of the CQI for a terminal selection sub band. A type 1a report supports feedbank of a sub band CQI and a second PMI. Type 2, type 2b, type 2c reports support feedback of a wideband CQI and a PMI. A type 2a report supports feedback of a wideband PMI. A type 3 report supports feedback of the RI. A type 4 report supports feedback of the wideband CQI. A type 5 report supports feedback of the RI and the wideband PMI. A type 6 report supports feedback of the RI and the PTI. A type 7 report supports feedback of the CRI and the RI. A type 8 report supports feedback of the CRI, the RI, and the wideband PMI. A type 9 report supports feedback of the CRI, the RI, and the PTI. A type 10 report supports feedback of the CRI.

In the terminal device 2, information related to the CSI measurement and the CSI report is set from the base station device 1. The CSI measurement is performed on the basis of the reference signal and/or the reference resources (for example, the CRS, the CSI-RS, the CSI-IM resources, and/or the DRS). The reference signal used for the CSI measurement is decided on the basis of the setting of the transmission mode or the like. The CSI measurement is performed on the basis of channel measurement and interference measurement. For example, power of a desired cell is measured through the channel measurement. Power and noise power of a cell other than a desired cell are measured through the interference measurement.

For example, in the CSI measurement, the terminal device 2 performs the channel measurement and the interference measurement on the basis of the CRS. For example, in the CSI measurement, the terminal device 2 performs the channel measurement on the basis of the CSI-RS and performs the interference measurement on the basis of the CRS. For example, in the CSI measurement, the terminal device 2 performs the channel measurement on the basis of the CSI-RS and performs the interference measurement on the basis of the CSI-IM resources.

The CSI process is set as information specific to the terminal device 2 through signaling of the higher layer. In the terminal device 2, one or more CSI processes are set, and the CSI measurement and the CSI report are performed on the basis of the setting of the CSI process. For example, in a case in which a plurality of CSI processes are set, the terminal device 2 independently reports a plurality of CSIs based on the CSI processes. Each CSI process includes a setting for the cell state information, an identifier of the CSI process, setting information related to the CSI-RS, setting information related to the CSI-IM, a sub frame pattern set for the CSI report, setting information related to the periodic CSI report, setting information related to the non-periodic CSI report. Further, the setting for the cell state information may be common to a plurality of CSI processes.

The terminal device 2 uses the CSI reference resources to perform the CSI measurement. For example, the terminal device 2 measures the CSI in a case in which the PDSCH is transmitted using a group of downlink physical resource blocks indicated by the CSI reference resources. In a case in which the CSI sub frame set is set through the signaling of the higher layer, each CSI reference resource belongs to one of the CSI sub frame sets and does not belong to both of the CSI sub frame sets.

In the frequency direction, the CSI reference resource is defined by the group of downlink physical resource blocks corresponding to the bands associated with the value of the measured CQI.

In the layer direction (spatial direction), the CSI reference resources are defined by the RI and the PMI whose conditions are set by the measured CQI. In other words, in the layer direction (spatial direction), the CSI reference resources are defined by the RI and the PMI which are assumed or generated when the CQI is measured.

In the time direction, the CSI reference resources are defined by one or more predetermined downlink sub frames. Specifically, the CSI reference resources are defined by a valid sub frame which is a predetermined number before a sub frame for reporting the CSI. The predetermined number of sub frames for defining the CSI reference resources is decided on the basis of the transmission mode, the frame configuration type, the number of CSI processes to be set, and/or the CSI report mode. For example, in a case in which one CSI process and the periodic CSI report mode are set in the terminal device 2, the predetermined number of sub frames for defining the CSI reference resource is a minimum value of 4 or more among valid downlink sub frames.

A valid sub frame is a sub frame satisfying a predetermined condition. A downlink sub frame in a serving cell is considered to be valid in a case in which some or all of the following conditions are satisfied.

(1) A valid downlink sub frame is a sub frame in an ON state in the terminal device 2 in which the RRC parameters related to the ON state and the OFF state are set;

(2) A valid downlink sub frame is set as the downlink sub frame in the terminal device 2;

(3) A valid downlink sub frame is not a multimedia broadcast multicast service single frequency network (MBSFN) sub frame in a predetermined transmission mode;

(4) A valid downlink sub frame is not included in a range of a measurement interval (measurement gap) set in the terminal device 2;

(5) A valid downlink sub frame is an element or part of a CSI sub frame set linked to a periodic CSI report when the CSI sub frame set is set in the terminal device 2 in the periodic CSI report; and (6) A valid downlink sub frame is an element or part of a CSI sub frame set linked to a downlink sub frame associated with a corresponding CSI request in an uplink DCI format in a non-periodic CSI report for the CSI process. Under these conditions, a predetermined transmission mode, a plurality of CSI processes, and a CSI sub frame set for the CSI process are set in the terminal device 2.

<Details of Multicarrier Transmission in Present Embodiment>

A plurality of cells are set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell).

One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG).

In the DC, the primary cell belongs to the MCG Further, in the SCG the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous transmission (DRX) may be performed.

In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information indicating a combination of bands in which the CA is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or a number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of LTE Downlink Resource Element Mapping in Present Embodiment>

Figure 10:
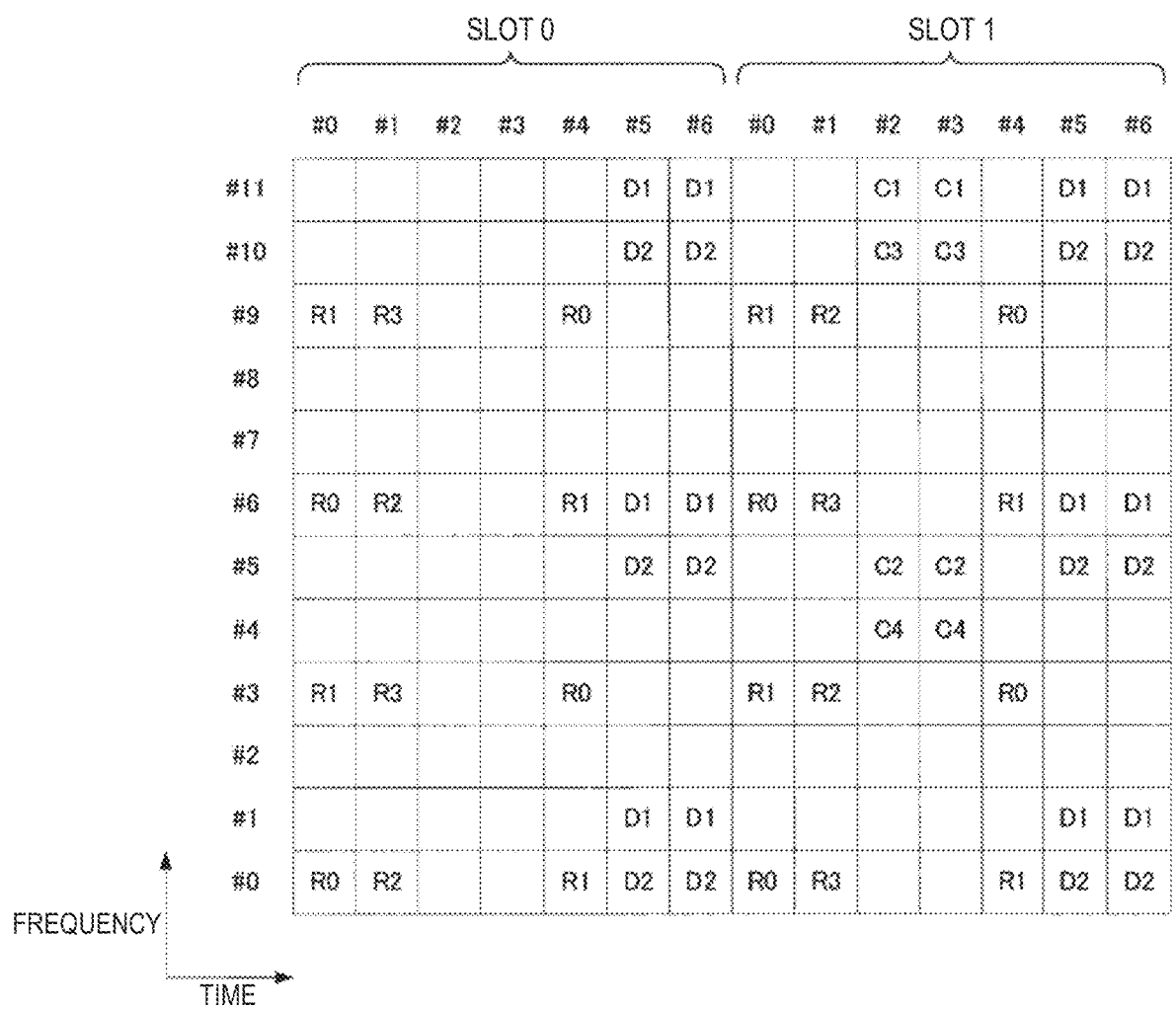
FIG. 10 is a diagram illustrating an example of downlink resource element mapping of LTE according to the present embodiment.

FIG. 10 is a diagram illustrating an example of LTE downlink resource element mapping in the present embodiment. In this example, a set of resource elements in one resource block pair in a case in which one resource block and the number of OFDM symbols in one slot are 7 will be described. Further, seven OFDM symbols in a first half in the time direction in the resource block pair are also referred to as a slot 0 (a first slot). Seven OFDM symbols in a second half in the time direction in the resource block pair are also referred to as a slot 1 (a second slot). Further, the OFDM symbols in each slot (resource block) are indicated by OFDM symbol number 0 to 6. Further, the sub carriers in the frequency direction in the resource block pair are indicated by sub carrier numbers 0 to 11. Further, in a case in which a system bandwidth is constituted by a plurality of resource blocks, a different sub carrier number is allocated over the system bandwidth. For example, in a case in which the system bandwidth is constituted by six resource blocks, the sub carriers to which the sub carrier numbers 0 to 71 are allocated are used. Further, in the description of the present embodiment, a resource element (k, l) is a resource element indicated by a sub carrier number k and an OFDM symbol number l.

Resource elements indicated by R 0 to R 3 indicate cell-specific reference signals of the antenna ports 0 to 3, respectively. Hereinafter, the cell-specific reference signals of the antenna ports 0 to 3 are also referred to as cell-specific RSs (CRSs). In this example, the case of the antenna ports in which the number of CRSs is 4 is described, but the number thereof can be changed. For example, the CRS can use one antenna port or two antenna ports. Further, the CRS can shift in the frequency direction on the basis of the cell ID. For example, the CRS can shift in the frequency direction on the basis of a remainder obtained by dividing the cell ID by 6.

Resource element indicated by C1 to C4 indicates reference signals (CSI-RS) for measuring transmission path states of the antenna ports 15 to 22. The resource elements denoted by C1 to C4 indicate CSI-RSs of a CDM group 1 to a CDM group 4, respectively. The CSI-RS is constituted by an orthogonal sequence (orthogonal code) using a Walsh code and a scramble code using a pseudo random sequence. Further, the CSI-RS is code division multiplexed using an orthogonal code such as a Walsh code in the CDM group. Further, the CSI-RS is frequency-division multiplexed (FDM) mutually between the CDM groups.

The CSI-RSs of the antenna ports 15 and 16 are mapped to C1. The CSI-RSs of the antenna ports 17 and 18 is mapped to C2. The CSI-RSs of the antenna port 19 and 20 are mapped to C3. The CSI-RSs of the antenna port 21 and 22 are mapped to C4.

A plurality of antenna ports of the CSI-RSs are specified.

The CSI-RS can be set as a reference signal corresponding to eight antenna ports of the antenna ports 15 to 22. Further, the CSI-RS can be set as a reference signal corresponding to four antenna ports of the antenna ports 15 to 18. Further, the CSI-RS can be set as a reference signal corresponding to two antenna ports of the antenna ports 15 to 16. Further, the CSI-RS can be set as a reference signal corresponding to one antenna port of the antenna port 15. The CSI-RS can be mapped to some sub frames, and, for example, the CSI-RS can be mapped for every two or more sub frames. A plurality of mapping patterns are specified for the resource element of the CSI-RS. Further, the base station device 1 can set a plurality of CSI-RSs in the terminal device 2.

The CSI-RS can set transmission power to zero. The CSI-RS with zero transmission power is also referred to as a zero power CSI-RS. The zero power CSI-RS is set independently of the CSI-RS of the antenna ports 15 to 22. Further, the CSI-RS of the antenna ports 15 to 22 is also referred to as a non-zero power CSI-RS.

The base station device 1 sets CSI-RS as control information specific to the terminal device 2 through the RRC signaling. In the terminal device 2, the CSI-RS is set through the RRC signaling by the base station device 1. Further, in the terminal device 2, the CSI-IM resources which are resources for measuring interference power can be set. The terminal device 2 generates feedback information using the CRS, the CSI-RS, and/or the CSI-IM resources on the basis of a setting from the base station device 1.

Resource elements indicated by D1 to D2 indicate the DL-DMRSs of the CDM group 1 and the CDM group 2, respectively. The DL-DMRS is constituted using an orthogonal sequence (orthogonal code) using a Walsh code and a scramble sequence according to a pseudo random sequence. Further, the DL-DMRS is independent for each antenna port and can be multiplexed within each resource block pair. The DL-DMRSs are in an orthogonal relation with each other between the antenna ports in accordance with the CDM and/or the FDM. Each of DL-DMRSs undergoes the CDM in the CDM group in accordance with the orthogonal codes. The DL-DMRSs undergo the FDM with each other between the CDM groups. The DL-DMRSs in the same CDM group are mapped to the same resource element. For the DL-DMRSs in the same CDM group, different orthogonal sequences are used between the antenna ports, and the orthogonal sequences are in the orthogonal relation with each other. The DL-DMRS for the PDSCH can use some or all of the eight antenna ports (the antenna ports 7 to 14). In other words, the PDSCH associated with the DL-DMRS can perform MIMO transmission of up to 8 ranks. The DL-DMRS for the EPDCCH can use some or all of the four antenna ports (the antenna ports 107 to 110). Further, the DL-DMRS can change a spreading code length of the CDM or the number of resource elements to be mapped in accordance with the number of ranks of an associated channel.

The DL-DMRS for the PDSCH to be transmitted through the antenna ports 7, 8, 11, and 13 are mapped to the resource element indicated by D1. The DL-DMRS for the PDSCH to be transmitted through the antenna ports 9, 10, 12, and 14 are mapped to the resource element indicated by D2. Further, the DL-DMRS for the EPDCCH to be transmitted through the antenna ports 107 and 108 are mapped to the resource element indicated by D1. The DL-DMRS for the EPDCCH to be transmitted through the antenna ports 109 and 110 are mapped to the resource element denoted by D2.

<Details of Downlink Resource Elements Mapping of NR in Present Embodiment>

Hereinafter, an example of downlink resource element mapping of predetermined resources in NR will be described.

Here, the predetermined resource may be referred to as an NR resource block (NR-RB) which is a resource block in NR. The predetermined resource can be defined on the basis of a unit of allocation related to a predetermined channel or a predetermined signal such as the NR-PDSCH or the NR-PDCCH, a unit in which mapping of the predetermined channel or the predetermined signal to a resource element is defined, and/or a unit in which the parameter set is set.

Figure 11:
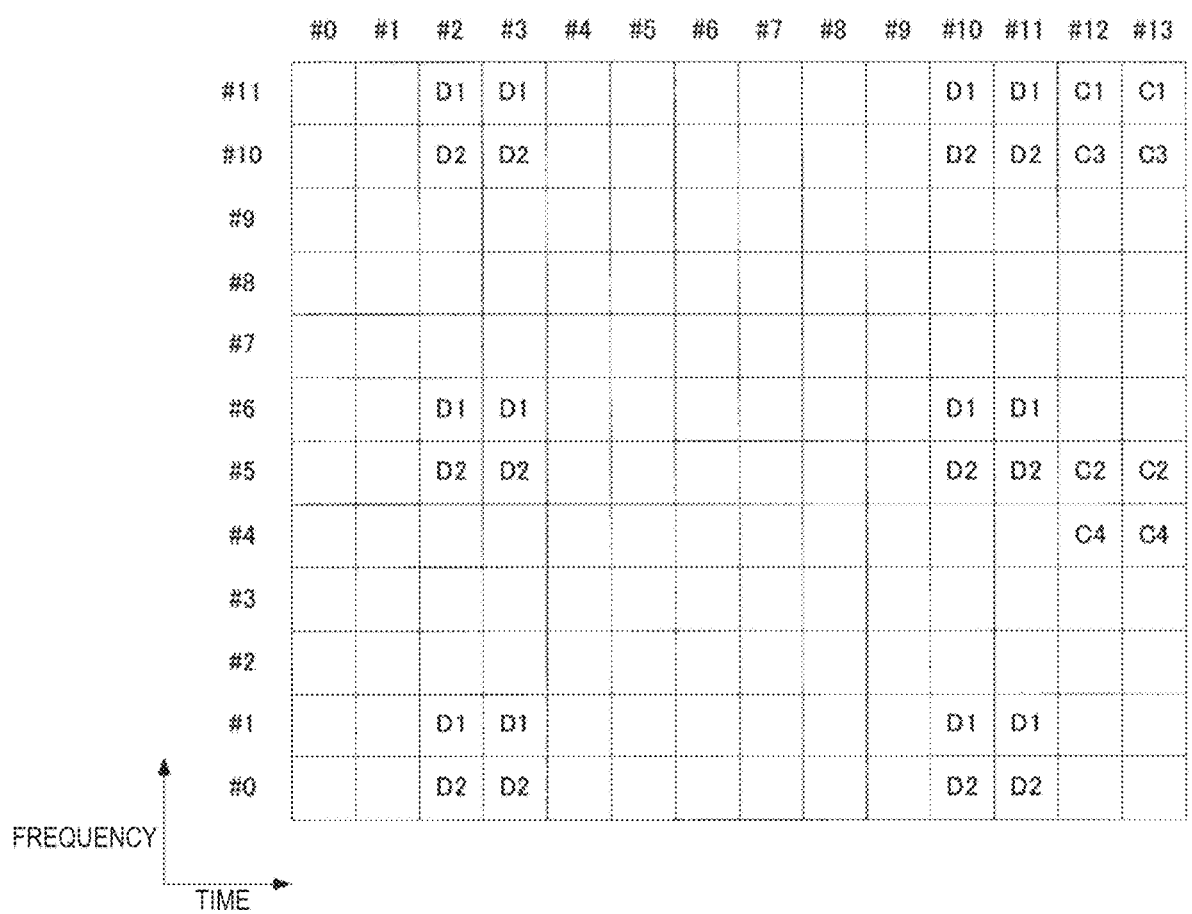
FIG. 11 is a diagram illustrating an example of downlink resource element mapping of NR according to the present embodiment.

FIG. 11 is a diagram illustrating an example of the downlink resource element mapping of NR according to the present embodiment. FIG. 11 illustrates a set of resource elements in the predetermined resources in a case in which parameter set 0 is used. The predetermined resources illustrated in FIG. 11 are resources formed by a time length and a frequency bandwidth such as one resource block pair in LTE.

In the example of FIG. 11, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
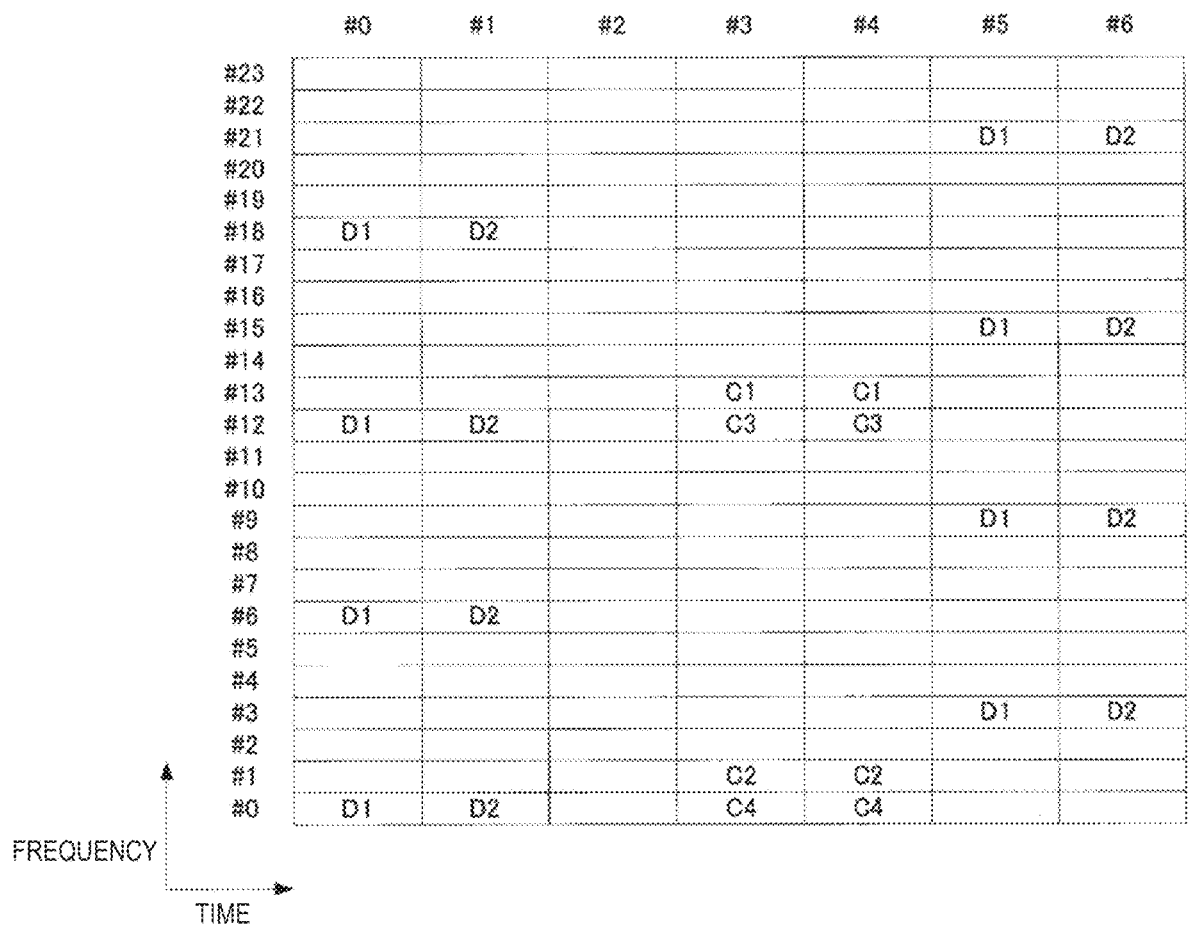
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 13:
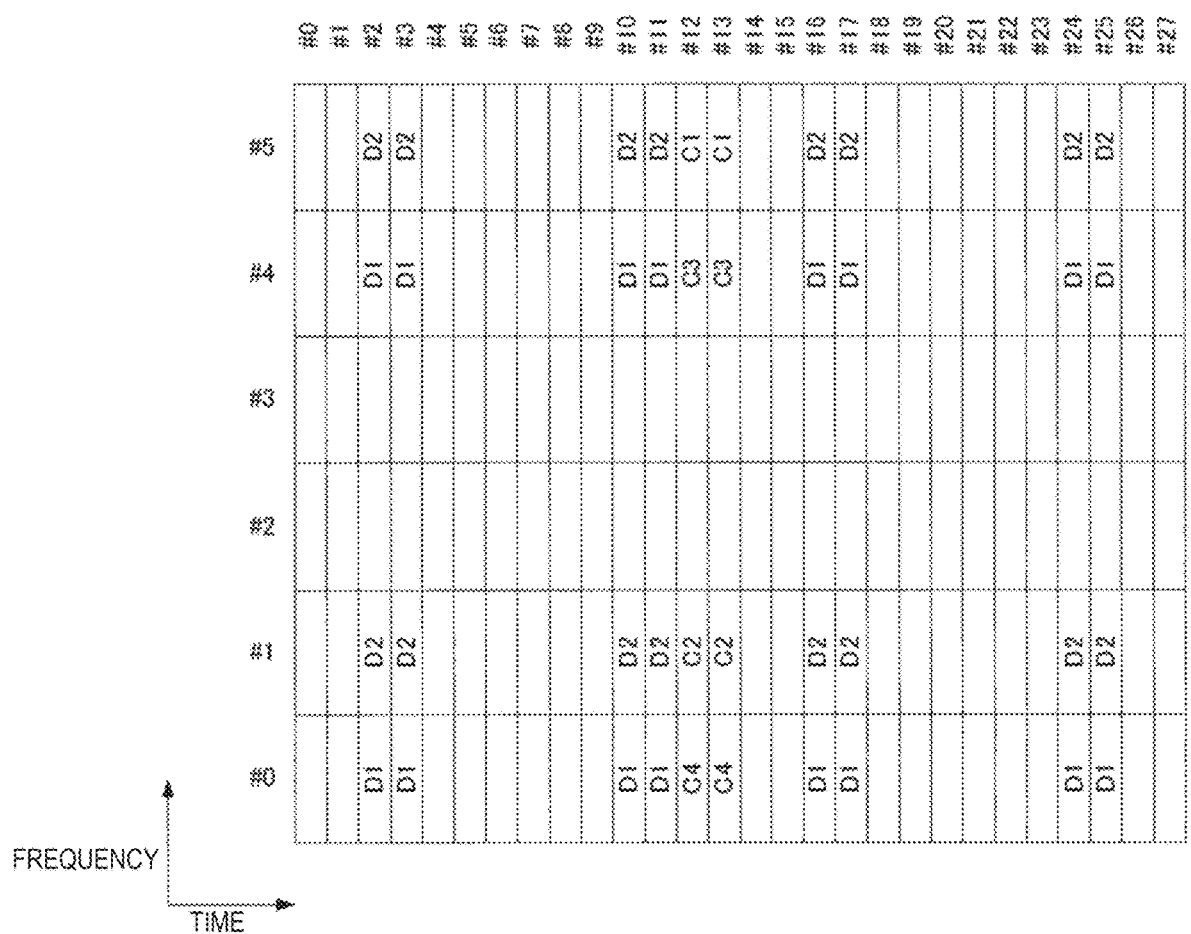
FIG. 13 is a diagram illustrating an example of downlink resource element mapping of NR according to the present embodiment.

FIG. 13 is a diagram illustrating an example of the downlink resource element mapping of NR according to the present embodiment. FIG. 13 illustrates a set of resource elements in the predetermined resources in a case in which parameter set 1 is used. The predetermined resources illustrated in FIG. 13 are resources formed by the same time length and frequency bandwidth as one resource block pair in LTE.

In the example of FIG. 13, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

For example, in NR, reference signals equivalent to the CRS in LTE may not transmitted.

<Details of Resource Element Mapping Method of NR in Present Embodiment>

As described above, in the present embodiment, physical signals with different parameters related to the transmission signal illustrated in FIGS. 11 to 13 can be multiplexed by the FDM or the like in NR. For example, the multiplexing is performed using predetermined resources as a unit. Further, even in a case in which the base station device 1 performing scheduling or the like recognizes the multiplexing, the terminal device terminal 2 may not recognize the multiplexing. The terminal device 2 may recognize only a physical signal received or transmitted by the terminal device 2 or may not recognize a physical signal not received or transmitted by the terminal device 2.

Further, parameters related to the transmission signal can be defined, set, or specified in the mapping to the resource elements. In NR, the resource element mapping can be performed using various methods. Note that, in the present embodiment, a method of the resource element mapping of NR will be described with regard to a downlink, but the same can apply to an uplink and a sidelink.

A first mapping method related to the resource element mapping in NR is a method of setting or specifying parameters (physical parameters) related to the transmission signal in the predetermined resources.

In the first mapping method, parameters related to the transmission signal are set in the predetermined resources. The parameters related to the transmission signal set in the predetermined resources include a sub frame interval of the sub carriers in the predetermined resources, the number of sub carriers included in the predetermined resources, the number of symbols included in the predetermined resources, a CP length type in the predetermined resources, a multiple access scheme used in the predetermined resources, and/or a parameter set in the predetermined resources.

For example, in the first mapping method, a resource grid in NR can be defined with the predetermined resources.

Figure 14:
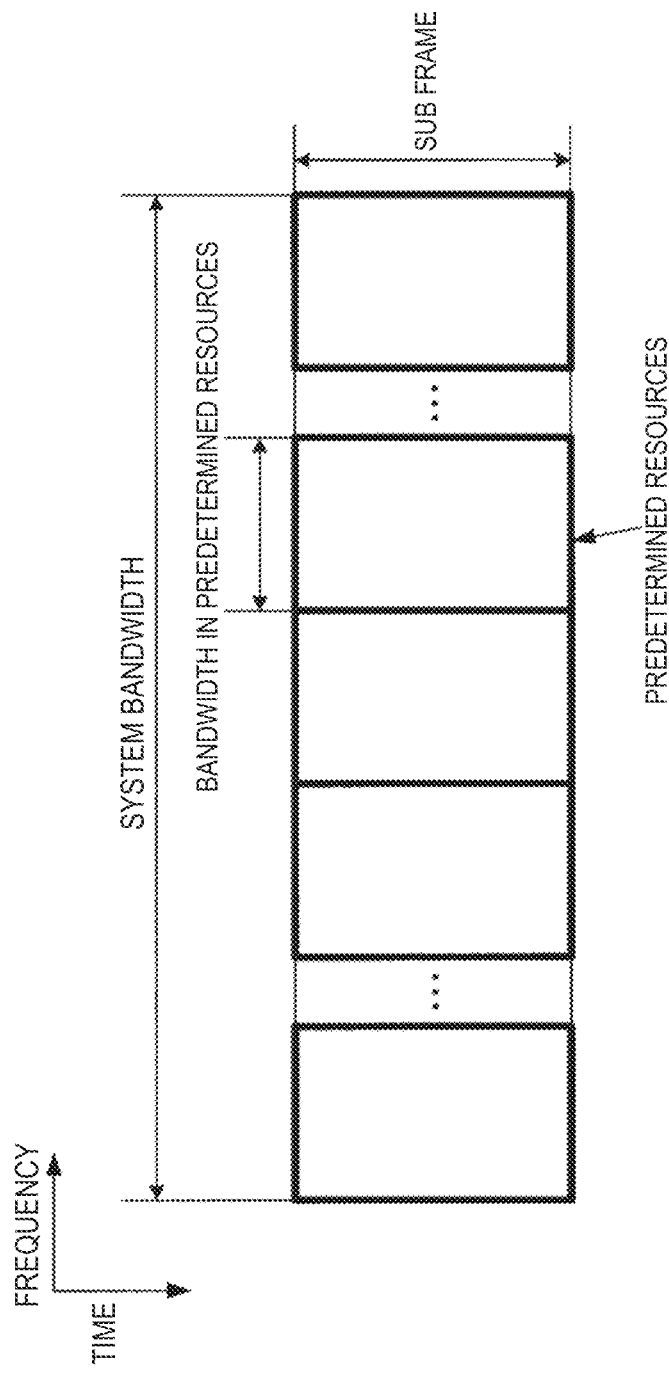
FIG. 14 is a diagram illustrating an example of a resource element mapping method of NR according to the present embodiment.

FIG. 14 is a diagram illustrating an example of a resource element mapping method of NR according to the present embodiment. In the example of FIG. 14, one or more predetermined resources can undergo the FDM in a predetermined system bandwidth and a predetermined time region (sub frame).

A bandwidth in the predetermined resources and/or a time length in the predetermined resources can be specified in advance. For example, a bandwidth in the predetermined resources corresponds to 180 kHz and a time length in the predetermined resources corresponds to 1 millisecond. That is, the predetermined resources correspond to the same bandwidth and time length as the resource block pair in LTE.

In addition, the bandwidth in the predetermined resources and/or the time length in the predetermined resources can be set by RRC signaling. For example, the bandwidth in the predetermined resources and/or the time length in the predetermined resources is set to be specific to the base station device 1 (cell) on the basis of information included in the MIB or the SIB transmitted via a broadcast channel or the like. Further, for example, the bandwidth in the predetermined resources and/or the time length in the predetermined resources is set to be specific to the terminal device 2 on the basis of control information specific to the terminal device 2.

In the first mapping method, the parameters related to the transmission signal set in the predetermined resources can be set by RRC signaling. For example, the parameters are set to be specific to the base station device 1 (cell) on the basis of information included in the MIB or the SIB transmitted via a broadcast channel or the like. Further, for example, the parameters are set to be specific to the terminal device 2 on the basis of control information specific to the terminal device 2.

In the first mapping method, the parameters related to the transmission signal set in the predetermined resources are set on the basis of at least one of the following methods or definitions.

(1) The parameters related to the transmission signal are set individually in each of the predetermined resources.

(2) The parameters related to the transmission signal are set individually in each group of the predetermined resources. The group of the predetermined resources is a set of the predetermined resources successive in the frequency direction. The number of predetermined resources included in the group may be specified in advance or may be set by RRC signaling.

(3) The predetermined resources in which certain parameters are set are predetermined successive resources decided on the basis of information indicating a starting predetermined resource and/or ending predetermined resource. The information can be set by RRC signaling.

(4) The predetermined resource in which a certain parameter is set is indicated by information regarding a bit map. For example, each bit included in the information regarding a bit map corresponds to the predetermined resource or a group of the predetermined resources. In a case in which the bit included in the information regarding the bit map is 1, the parameter is set in the predetermined resource or the group of the predetermined resources corresponding to the bit. The information regarding the bit map can be set by RRC signaling.

(5) In the predetermined resource to which a predetermined signal or a predetermined channel is mapped (transmitted), a parameter specified in advance is used. For example, in the predetermined resource in which a synchronization signal or a broadcast channel is transmitted, a parameter specified in advance is used. For example, the parameter specified in advance corresponds to the same bandwidth and time length as the resource block pair in LTE.

(6) In a predetermined time region including the predetermined resources in which the predetermined signals or the predetermined channels are mapped (transmitted) (that is, all the predetermined resources included in the predetermined time region), parameters specified in advance are used. For example, in a sub frame including a predetermined resource in which a synchronization signal or a broadcast channel is transmitted, a parameter specified in advance is used. For example, the parameter specified in advance corresponds to the same bandwidth and time length as the resource block pair in LTE.

(7) In a predetermined resource in which a parameter is not set, a parameter specified in advance is used. For example, in a predetermined resource in which a parameter is not set, the same parameter as the predetermined resource in which a synchronization signal or a broadcast channel is transmitted is used.

(8) In one cell (component carrier), parameters which can be set are restricted. For example, for a sub carrier interval which can be set in one cell, the bandwidth in the predetermined resources is a value which is an integer multiple of the sub carrier interval. Specifically, in a case in which the bandwidth in the predetermined resources is 180 kHz, the sub carrier interval which can be set includes 3.75 kHz, 7.5 kHz, 15 kHz, 30 kHz, and 60 kHz.

A second mapping method related to the resource element mapping in NR is a method based on sub resource elements used to define a resource element.

In the second mapping method, the sub resource elements are used to specify, set, or define a resource element corresponding to a parameter related to the transmission signal. In the second mapping method, the resource element and the sub resource element are referred to as a first element and a second element, respectively.

In other words, in the second mapping method, the parameters (physical parameters) related to the transmission signal are set on the basis of the setting related to the sub resource elements.

For example, in a predetermined resource, the number of sub resource elements or a pattern of the sub resource elements included in one resource element is set. Further, the predetermined resources can be set to be the same as the predetermined resources described in the present embodiment.

For example, in the second mapping method, a resource grid in NR can be defined with a predetermined number of sub resource elements.

Figure 15:
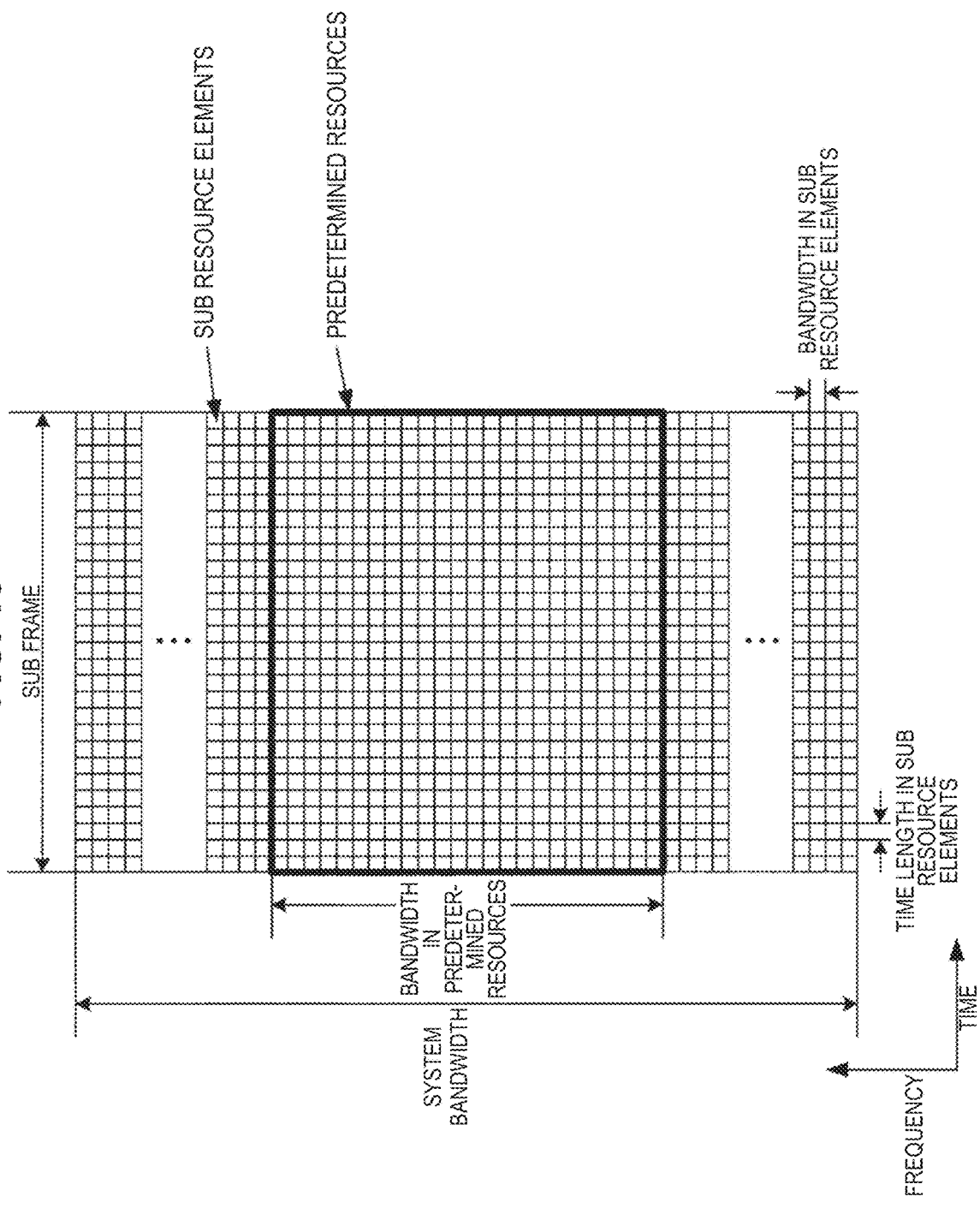
FIG. 15 is a diagram illustrating an example of a resource element mapping method of NR according to the present embodiment.

FIG. 15 is a diagram illustrating an example of a resource element mapping method of NR according to the present embodiment. In the example of FIG. 15, each predetermined resource includes 28 sub resource elements in the time direction and 24 sub resource elements in the frequency direction. That is, in a case in which the frequency bandwidth in the predetermined resources is 180 kHz, the frequency bandwidth in the sub resource elements is 7.5 kHz.

A bandwidth in the sub resource elements and/or a time length in the sub resource elements can be specified in advance. Further, for example, the sub resource elements correspond to the same bandwidth (15 kHz) and time length as the sub resource elements in LTE.

In addition, the bandwidth in the sub resource elements and/or the time length in the sub resource elements can be set by RRC signaling. For example, the bandwidth in the sub resource elements and/or the time length in the sub resource elements are set to be specific to the base station device 1 (cell) on the basis of information included in the MIB or the SIB transmitted via a broadcast channel or the like. Further, for example, the bandwidth in the sub resource elements and/or the time length in the sub resource elements is set to be specific to the terminal device 2 on the basis of control information specific to the terminal device 2. Further, in a case in which the bandwidth in the sub resource elements and/or the time length in the sub resource elements is not set, the sub resource elements can correspond to the same bandwidth (15 kHz) and time length as the sub resource elements in LTE.

In the second mapping method, the sub resource elements included in one resource element can be set on the basis of at least one of the following methods or definitions.

(1) The setting is performed individually for each predetermined resource.

(2) The setting is performed individually for each group of the predetermined resources. The group of the predetermined resources is a set of the predetermined resources successive in the frequency direction. The number of predetermined resources included in the group may be specified in advance or may be set by RRC signaling.

(3) The predetermined resources on which the setting is performed are predetermined successive resources decided on the basis of information indicating a starting predetermined resource and/or ending predetermined resource. The information can be set by RRC signaling.

(4) The predetermined resource on which the setting is performed is indicated by information regarding a bit map. For example, each bit included in the information regarding a bit map corresponds to the predetermined resource or a group of the predetermined resources. In a case in which the bit included in the information regarding the bit map is 1, the setting is performed on the predetermined resource or the group of the predetermined resources corresponding to the bit. The information regarding the bit map can be set by RRC signaling.

(5) In the predetermined resource to which a predetermined signal or a predetermined channel is mapped (transmitted), the sub resource elements included in one resource element are specified in advance. For example, in the predetermined resource in which a synchronization signal or a broadcast channel is transmitted, the sub resource elements included in one resource element are specified in advance. For example, the sub resource elements specified in advance correspond to the same bandwidth and time length as the resource elements in LTE.

(6) In a predetermined time region including the predetermined resources in which the predetermined signals or the predetermined channels are mapped (transmitted) (that is, all the predetermined resources included in the predetermined time region), the sub resource elements included in one resource element are specified in advance. For example, in a predetermined time region including the predetermined resources in which a synchronization signal or a broadcast channel is transmitted, the sub resource elements included in one resource element are specified in advance. For example, the sub resource elements specified in advance correspond to the same bandwidth and time length as the resource elements in LTE.

(7) In the predetermined resources in which the setting is not performed, the sub resource elements included in one resource element are specified in advance. For example, in the predetermined resources in which the setting is not performed, the sub resource elements included in one resource element are the same sub resource elements used in the predetermined resource in which a synchronization signal or a broadcast channel is transmitted.

(8) The setting is the number of sub resource elements included in one resource element. The number of sub resource elements included in one resource element in the frequency direction and/or the time direction is set. For example, the sub resource elements are considered to be set as in FIG. 15. In a case in which 1 resource element includes 2 sub resource elements in the frequency direction and 2 sub resource elements in the time direction in the predetermined resource, the predetermined resource includes 12 sub carriers and 14 symbols. This configuration (setting) is the same as the number of sub carriers and the number of symbols included in the resource block pair in LTE and is suitable for a use case of eMBB. Further, in a case in which 1 resource element includes 4 sub resource elements in the frequency direction and 1 sub resource element in the time direction in the predetermined resource, the predetermined resource includes 6 sub carriers and 28 symbols. This configuration (setting) is suitable for a use case of URLLC. Further, in a case in which 1 resource element includes 1 sub resource element in the frequency direction and 4 sub resource elements in the time direction in the predetermined resource, the predetermined resource includes 24 sub carriers and 7 symbols. This configuration (setting) is suitable for a use case of mMTC.

(9) The number of sub resource elements included in one resource element described in the foregoing (8) is patterned in advance and information (an index) indicating the pattern is used for the setting. The pattern can include a CP length type, definition of the sub resource elements, a multiple access scheme, and/or a parameter set.

(10) In one cell (component carrier) or one time region (sub frame), the number of sub resource elements included in one resource element is constant. For example, in one cell or one time region, all the number of sub resource elements included in one resource element is 4 as in the example described in the foregoing (8). That is, in the example, it is possible to configure the resource element of the bandwidth and the time length in which the number of sub resource elements included in one resource element is 4.

Note that in the description of the present embodiment, the predetermined resource has been used for the resource element mapping in a downlink, an uplink, or a sidelink in NR, as described above. However, the present disclosure is not limited thereto. The predetermined resource may be used for resource element mapping in two or more links among a downlink, an uplink, and a sidelink.

For example, the predetermined resource is used for resource element mapping in the downlink, the uplink, and the sidelink. In a certain predetermined resource, a predetermined number of front symbols is used for resource element mapping in the downlink. In the predetermined resource, a predetermined number of rear symbols is used for resource element mapping in the uplink. In the predetermined resource, a predetermined number of symbols between the predetermined number of front symbols and the predetermined number of rear symbols may be used for a guard period. In the predetermined resource, with regard to the predetermined number of front symbols and the predetermined number of rear symbols, the same physical parameters may be used or independently set physical parameters may be used.

Note that in the description of the present embodiment, the downlink, the uplink, and the sidelink have been described as the independently defined links in NR, but the present disclosure is not limited thereto. The downlink, the uplink, and the sidelink may be defined as a common link. For example, the channels, the signals, the processes, and/or the resources and the like described in the present embodiment are defined irrespective of the downlink, the uplink, and the sidelink. In the base station device 1 or the terminal device 2, the channels, the signals, the processes, and/or the resource, and the like are decided on the basis of the setting specified in advance, the setting by RRC signaling, and/or the control information in the physical layer. For example, in the terminal device 2, channels and signals which can be transmitted and received are decided on the basis of setting form the base station device 1.

APPLICATION EXAMPLES

Application Examples for Base Station

First Application Example

Figure 16:
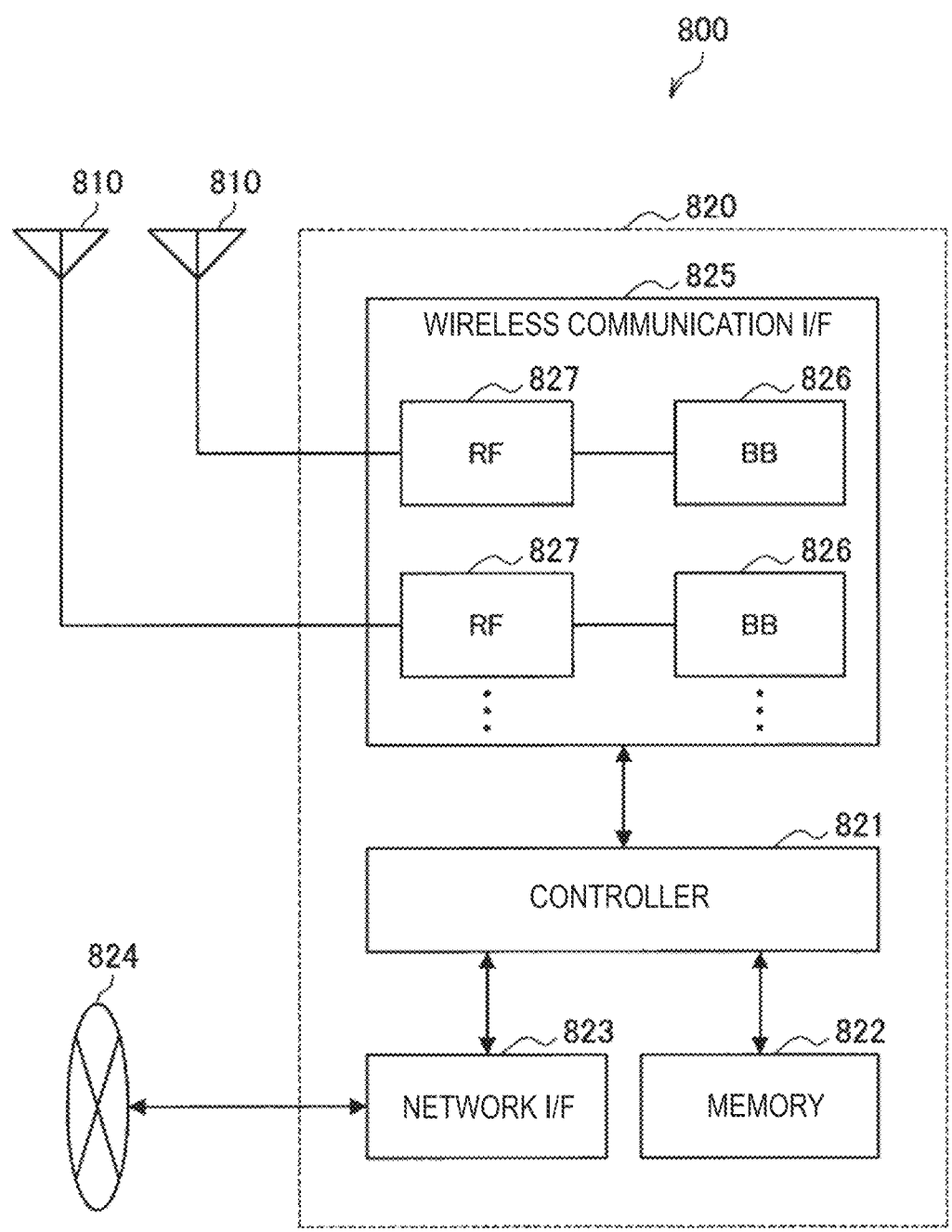
FIG. 16 is a block diagram illustrating a first example of a schematic configuration of an eNB to which the technology according to the present disclosure may be applied.

FIG. 16 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 16, and the plurality of antennas 810 may, for example, correspond to a plurality of frequency bands used by the eNB 800. It should be noted that while FIG. 16 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 16, and the plurality of BB processors 826 may, for example, correspond to a plurality of frequency bands used by the eNB 800. Further, the wireless communication interface 825 may also include a plurality of the RF circuits 827, as illustrated in FIG. 16, and the plurality of RF circuits 827 may, for example, correspond to a plurality of antenna elements. Note that FIG. 16 illustrates an example in which the wireless communication interface 825 includes the plurality of BB processors 826 and the plurality of RF circuits 827, but the wireless communication interface 825 may include the single BB processor 826 or the single RF circuit 827.

Second Application Example

Figure 17:
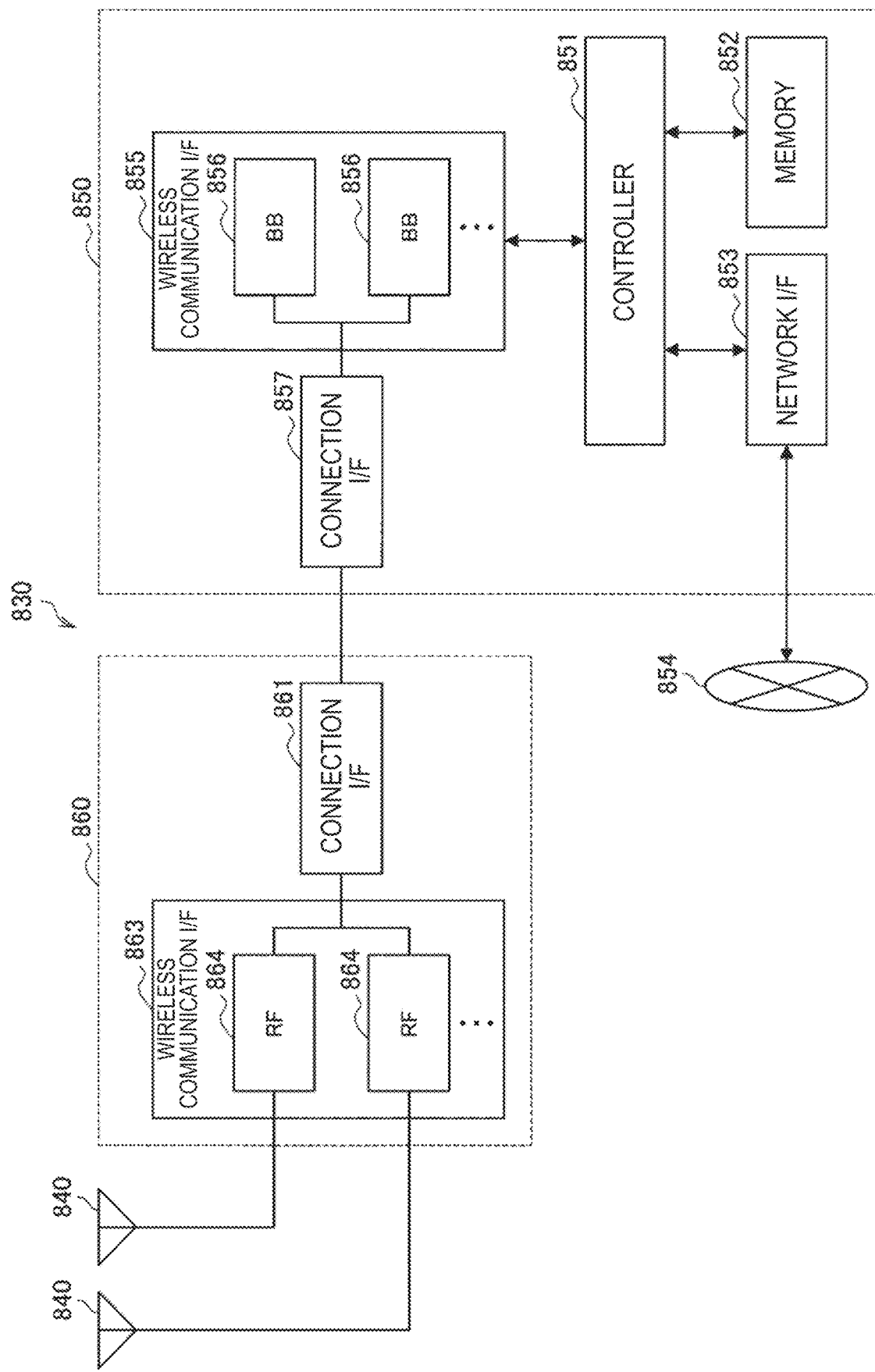
FIG. 17 is a block diagram illustrating a second example of the schematic configuration of the eNB to which the technology according to the present disclosure may be applied.

FIG. 17 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 17, and the plurality of antennas 840 may, for example, correspond to a plurality of frequency bands used by the eNB 830. Note that FIG. 17 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 16.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 15 except that the BB processor 856 is connected to an RF circuit 864 of the RRH 860 via the connection interface 857. The wireless communication interface 855 may include a plurality of the BB processors 856, as illustrated in FIG. 16, and the plurality of BB processors 856 may, for example, correspond to a plurality of frequency bands used by the eNB 830. Note that FIG. 16 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 17, and the plurality of RF circuits 864 may, for example, correspond to a plurality of antenna elements. Note that FIG. 17 illustrates an example in which the wireless communication interface 863 includes the plurality of RF circuits 864, but the wireless communication interface 863 may include the single RF circuit 864.

The eNB 800, the eNB 830, the base station device 820, or the base station device 850 illustrated in FIGS. 16 and 17 may correspond to the base station device 1 described above with reference to FIG. 3 and the like.

Application Examples for Terminal Apparatus

First Application Example

Figure 18:
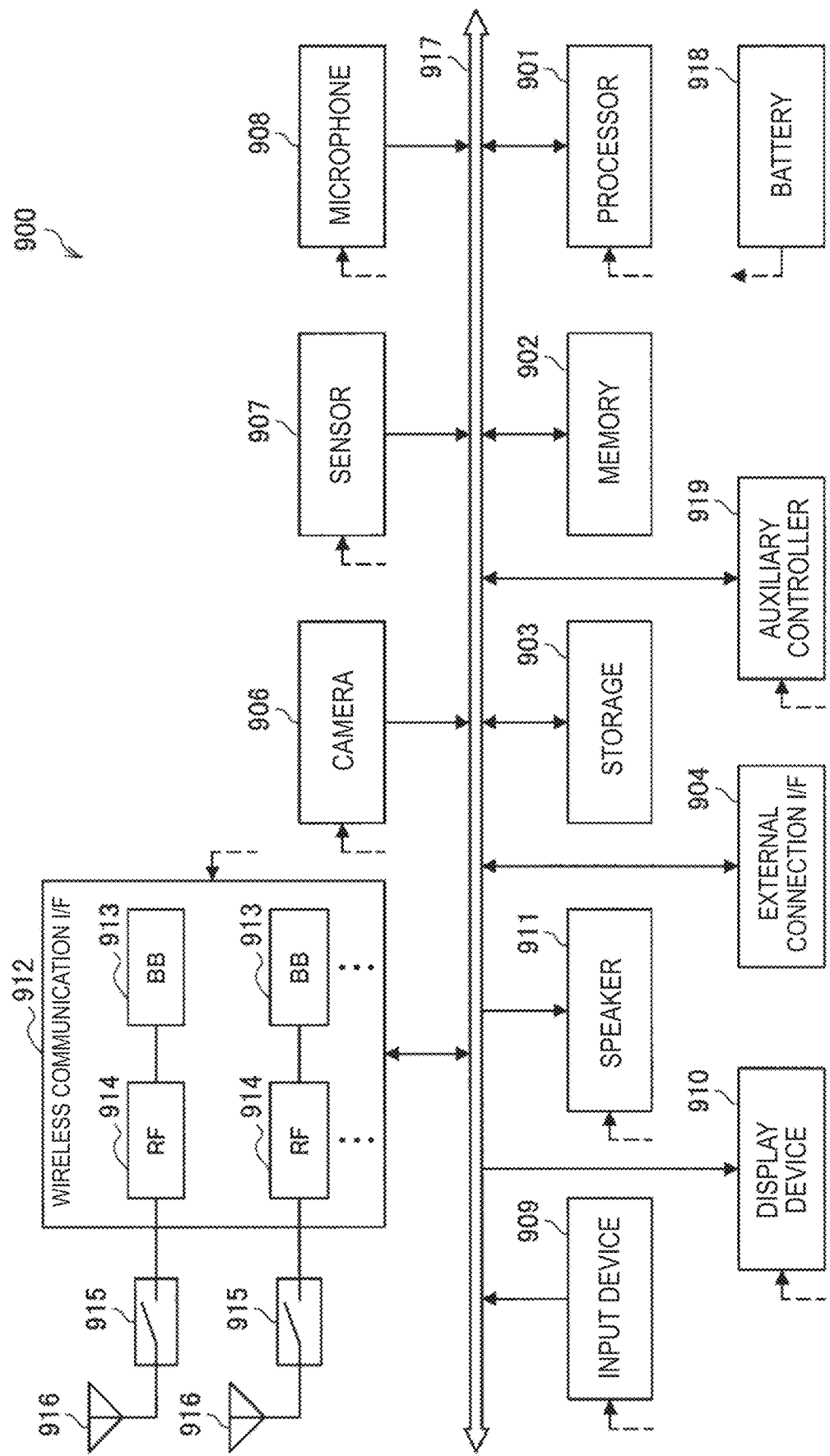
FIG. 18 is a block diagram illustrating an example of a schematic configuration of a smartphone 900 to which the technology according to the present disclosure may be applied.

FIG. 18 is a block diagram illustrating an example of a schematic configuration of a smartphone 900 as the terminal apparatus 2 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 18. Note that FIG. 18 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 18. Note that FIG. 18 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 18 via a feeder line that is partially illustrated in the figure as a dashed line. The auxiliary controller 919, for example, operates a minimally necessary function of the smartphone 900 in a sleep mode.

Second Application Example

Figure 19:
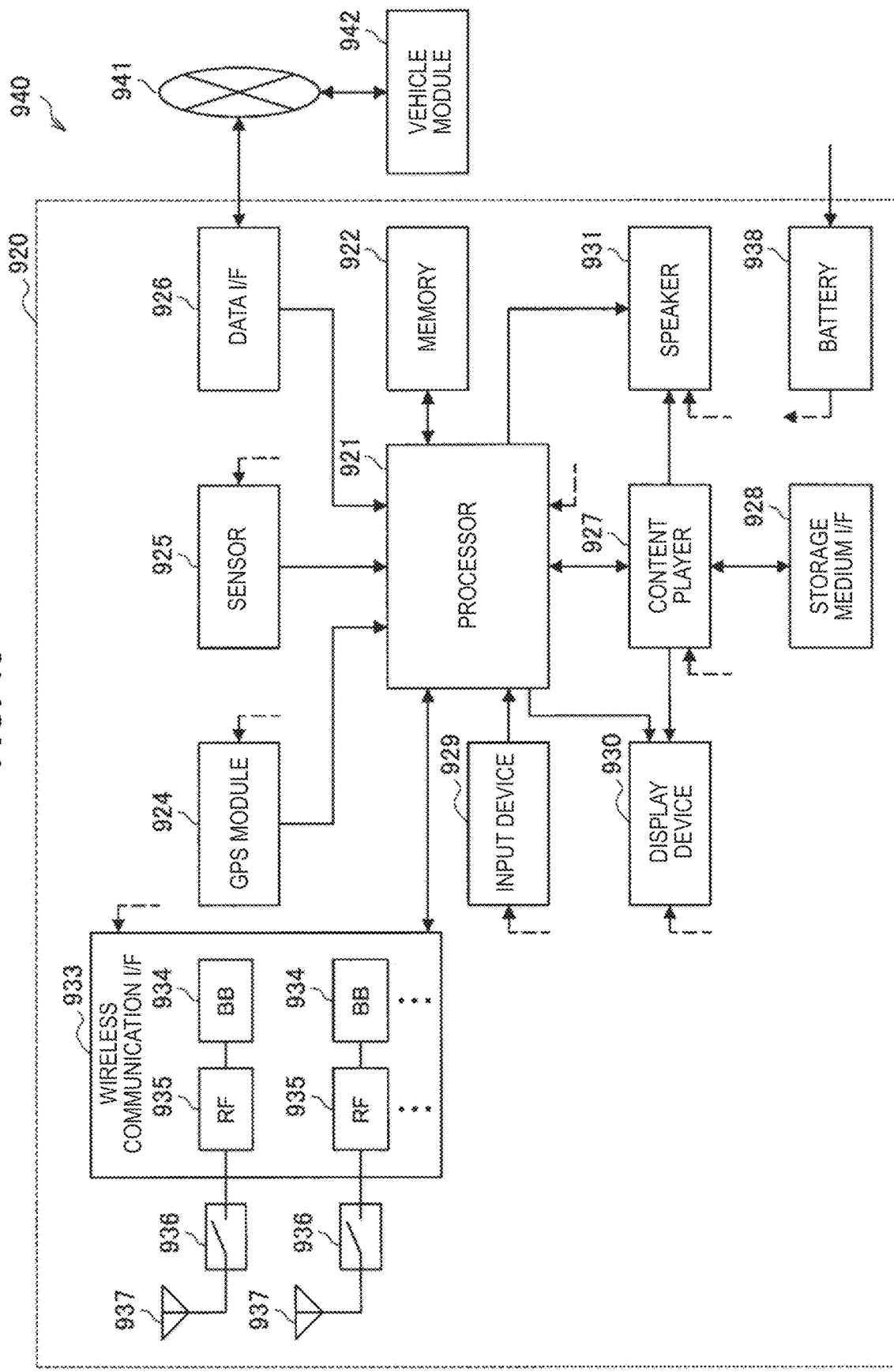
FIG. 19 is a block diagram illustrating an example of a schematic configuration of a car navigation apparatus 920 to which the technology according to the present disclosure may be applied.

FIG. 19 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 19. Note that FIG. 19 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 19. Note that FIG. 19 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 19 via a feeder line that is partially illustrated in the figure as a dashed line. Further, the battery 938 accumulates the electric power supplied from the vehicle.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A terminal device that communicates with a base station device, the terminal station device including:

a higher layer processing unit configured to set at least one first RAT and at least one second RAT by signaling of a higher layer from the base station device; and a receiving unit configured to receive a transmission signal in the first RAT and a transmission signal in the second RAT, in which the transmission signal in the first RAT is mapped to a resource element configured on a basis of one physical parameter for each sub frame, and the transmission signal in the second RAT is mapped to a resource element configured on a basis of one or more physical parameters for each sub frame and is mapped to a resource element configured on a basis of one physical parameter in a predetermined resource included in each of the sub frames.

(2)

The terminal device according to (1), in which the higher layer processing unit sets the physical parameter used for the transmission signal in the second RAT.

(3)

The terminal device according to (1) or (2), in which, in a case in which the physical parameter is not set, the transmission signal in the second RAT is generated on a basis of a physical parameter specified in advance.

(4)

The terminal device according to any one of (1) to (3), in which the physical parameter is a sub carrier interval.

(5)

The terminal device according to any one of (1) to (3), in which the physical parameter is a symbol length.

(6)

The terminal device according to any one of (1) to 3, in which the physical parameter is a number of subcarriers in the predetermined resource included in each of the sub frames.

(7)

The terminal device according to any one of (1) to 3, in which the physical parameter is a number of symbols in the predetermined resource included in each of the sub frames.

(8)

The terminal device according to any one of (1) to 7, in which each of the resource elements to which the transmission signal in the second RAT is mapped is configured using a predetermined number of sub resource elements corresponding to the physical parameter.

(9)

The terminal device according to (8), in which the higher layer processing unit sets the predetermined number of sub resource elements in the predetermined resource.

(10)

A base station device that communicates with a terminal device, the base station device including:

a higher layer processing unit configured to set at least one first RAT and at least one second RAT by signaling of a higher layer to the terminal device; and a transmitting unit configured to transmit a transmission signal in the first RAT and a transmission signal in the second RAT, in which the transmission signal in the first RAT is mapped to a resource element configured on a basis of one physical parameter for each sub frame, and the transmission signal in the second RAT is mapped to a resource element configured on a basis of one or more physical parameters for each sub frame and is mapped to a resource element configured on a basis of one physical parameter in a predetermined resource included in each of the sub frames.

(11)

A communication method that is used in a terminal device communicating with a base station device, the communication method including:

a step of setting at least one first RAT and at least one second RAT by signaling of a higher layer from the base station device; and a step of receiving a transmission signal in the first RAT and a transmission signal in the second RAT, in which the transmission signal in the first RAT is mapped to a resource element configured on a basis of one physical parameter for each sub frame, and the transmission signal in the second RAT is mapped to a resource element configured on a basis of one or more physical parameters for each sub frame and is mapped to a resource element configured on a basis of one physical parameter in a predetermined resource included in each of the sub frames.

(12)
A communication method that is used in a base station device communicating with a terminal device, the communication method including:
a step of setting at least one first RAT and at least one second RAT by signaling of a higher layer to the terminal device; and
a step of transmitting a transmission signal in the first RAT and a transmission signal in the second RAT,
in which the transmission signal in the first RAT is mapped to a resource element configured on a basis of one physical parameter for each sub frame, and
the transmission signal in the second RAT is mapped to a resource element configured on a basis of one or more physical parameters for each sub frame and is mapped to a resource element configured on a basis of one physical parameter in a predetermined resource included in each of the sub frames.

The invention claimed is:

1. A user equipment comprising:
a transceiver; and
a processing circuitry coupled to the transceiver, the processing circuitry being configured to:
receive by Radio Resource Control (RRC) signaling:
first information indicating a parameter set regarding a Synchronization Signal (SS) and Physical Broadcast Channel (PBCH) in a New Radio (NR) cell,
wherein the parameter set regarding the SS and the PBCH comprises a subcarrier spacing common to the SS and the PBCH, and
second information indicating a predetermined starting resource of a plurality of resources in the NR cell that are successive in a frequency direction,
wherein the SS and the PBCH are transmitted in the successive plurality of resources in the NR cell; and
receive the SS and the PBCH in the NR cell based on the first information and the second information,
wherein the plurality of resources in the NR cell that are successive in the frequency direction where the SS and the PBCH are transmitted are successive resources decided based on the predetermined starting resource and are expressed as a number of multiple subcarriers in the frequency direction, and
wherein the SS includes a Primary Synchronization signal (PSS) and a Secondary Synchronization Signal (SSS).

2. The user equipment according to claim 1, wherein the subcarrier spacing common to the SS and the PBCH is one of multiple subcarrier spacings configured for one cell.

3. The user equipment according to claim 2, wherein the subcarrier spacing common to the SS and the PBCH is independently configured for each of a plurality of predetermined frequency resources configured for the one cell.

4. A base station apparatus comprising:
a transceiver; and
a processing circuitry coupled to the transceiver, the processing circuitry being configured to:
provide, by Radio Resource Control (RRC) signaling:
first information indicating a parameter set regarding a Synchronization Signal (SS) and Physical Broadcast Channel (PBCH) in a New Radio (NR) cell,
wherein the parameter set regarding the SS and the PBCH comprises a subcarrier spacing common to the SS and the PBCH, and
second information indicating a predetermined starting resource of a plurality of resources in the NR cell that are successive in a frequency direction,
wherein the SS and the PBCH are transmitted in the successive plurality of resources in the NR cell; and
transmit the SS and the PBCH in the NR cell based on the first information and the second information,
wherein the plurality of resources in the NR cell that are successive in the frequency direction where the SS and the PBCH are transmitted are successive resources decided based on the predetermined starting resource and are expressed as a number of multiple subcarriers in the frequency direction, and
wherein the SS includes a Primary Synchronization signal (PSS) and a Secondary Synchronization Signal (SSS).

5. The base station apparatus according to claim 4, wherein the base station apparatus is a base station itself or a Remote Radio Head (RRH) connected with the base station.

6. The base station apparatus according to claim 5, wherein the subcarrier spacing common to the SS and the PBCH is one of multiple subcarrier spacings configured for one cell.

7. The base station apparatus according to claim 6, wherein the subcarrier spacing common to the SS and the PBCH is independently configured for each of a plurality of predetermined frequency resources configured for the one cell.

8. A method for a user equipment, the method comprising:
receiving by Radio Resource Control (RRC) signaling:
first information indicating a parameter set regarding a Synchronization Signal (SS) and Physical Broadcast Channel (PBCH) in a New Radio (NR) cell,
wherein the parameter set regarding the SS and the PBCH comprises a subcarrier spacing common to the SS and the PBCH, and
second information indicating a predetermined starting resource of a plurality of resources in the NR cell that are successive in a frequency direction,
wherein the SS and the PBCH are transmitted in the successive plurality of resources in the NR cell; and
receiving the SS and the PBCH in the NR cell based on the first information and the second information,
wherein the plurality of resources in the NR cell that are successive in the frequency direction where the SS and the PBCH are transmitted are successive resources decided based on the predetermined starting resource and are expressed as a number of multiple subcarriers in the frequency direction, and
wherein the SS includes a Primary Synchronization signal (PSS) and a Secondary Synchronization Signal (SSS).

9. The method according to claim 8, wherein the subcarrier spacing common to the SS and the PBCH is one of multiple subcarrier spacings configured for one cell.

10. The method according to claim 9, wherein the subcarrier spacing common to the SS and the PBCH is independently configured for each of a plurality of predetermined frequency resources configured for the one cell.

11. A method for a base station apparatus, the method comprising:
providing; by Radio Resource Control (RRC) signaling information comprising:
first information indicating a parameter set regarding a Synchronization Signal (SS) and Physical Broadcast Channel (PBCH) in a New Radio (NR) cell, wherein the parameter set regarding the SS and the PBCH comprises a subcarrier spacing common to the SS and the PBCH, and second information indicating a predetermined starting resource of a plurality of resources in the NR cell that are successive in a frequency direction, wherein the SS and the PBCH are transmitted in the successive plurality of resources in the NR cell; and transmitting the SS and the PBCH in the NR cell based on the first information and the second information, wherein the plurality of resources in the NR cell that are successive in the frequency direction where the SS and the PBCH are transmitted are successive resources decided based on the predetermined starting resource and are expressed as a number of multiple subcarriers in the frequency direction, and wherein the SS includes a Primary Synchronization signal (PSS) and a Secondary Synchronization Signal (SSS).

12. The method according to claim 11, wherein the base station apparatus is a base station itself or a Remote Radio Head (RRH) connected with the base station.

13. The method according to claim 12, wherein the subcarrier spacing common to the SS and the PBCH is one of multiple subcarrier spacings configured for one cell.

14. The method according to claim 13, wherein the subcarrier spacing common to the SS and the PBCH is independently configured for each of a plurality of predetermined frequency resources configured for the one cell.

15. An electric device comprising:
a circuitry configured to control a transceiver to:
receive by Radio Resource Control (RRC) signaling:
first information indicating a parameter set regarding a Synchronization Signal (SS) and Physical Broadcast Channel (PBCH) in a New Radio (NR) cell,
wherein the parameter set regarding the SS and the PBCH comprises a subcarrier spacing common to the SS and the PBCH, and
second information indicating a predetermined starting resource of a plurality of resources in the NR cell that are successive in a frequency direction,
wherein the SS and the PBCH are transmitted in the successive plurality of resources in the NR cell; and
receive the SS and the PBCH in the NR cell based on the first information and the second information,
wherein the plurality of resources in the NR cell that are successive direction in the frequency direction where the SS and the PBCH are transmitted in the NR cell are successive resources decided based on the predetermined starting resource and are expressed as the number of multiple subcarriers in the frequency direction, and
wherein the SS includes a Primary Synchronization signal (PSS) and a Secondary Synchronization Signal (SSS).

16. The electric device according to claim 15, wherein the subcarrier spacing common to the SS and the PBCH is one of multiple subcarrier spacings configured for one cell.

17. The electric device according to claim 16, wherein the subcarrier spacing common to the SS and the PBCH is independently configured for each of a plurality of predetermined frequency resources configured for the one cell.

* * * * *